(12) United States Patent
Kodama et al.

(10) Patent No.: US 8,819,205 B2
(45) Date of Patent: Aug. 26, 2014

(54) CONTENT TRANSFER SYSTEM, CONTENT TRANSFER METHOD AND HOME SERVER

(75) Inventors: Shoji Kodama, Chiyoda-ku (JP);
Kiyotake Kumazawa, Chiyoda-ku (JP);
Naoko Iwami, Chiyoda-ku (JP); Akira Yamamoto, Chiyoda-ku (JP); Masaaki Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 986 days.

(21) Appl. No.: 12/052,450

(22) Filed: Mar. 20, 2008

(65) Prior Publication Data
US 2009/0106407 A1 Apr. 23, 2009

(30) Foreign Application Priority Data

Oct. 19, 2007 (JP) .................. 2007-273077
Jan. 8, 2008 (JP) .................. 2008-001241

(51) Int. Cl.
*G06F 15/177* (2006.01)
*G06F 15/173* (2006.01)

(52) U.S. Cl.
USPC ........... 709/223; 709/220; 709/221; 709/224; 709/225; 709/226

(58) Field of Classification Search
USPC .......... 709/203, 220, 221, 223, 224, 225, 226
See application file for complete search history.

(56) References Cited

U.S. PATENT DOCUMENTS

| | | | |
|---|---|---|---|
| 2004/0033062 A1* | 2/2004 | Taira et al. | 386/125 |
| 2004/0034752 A1* | 2/2004 | Ohran | 711/161 |
| 2004/0111490 A1* | 6/2004 | Im et al. | 709/218 |
| 2004/0267903 A1* | 12/2004 | Ido et al. | 709/217 |
| 2005/0060507 A1* | 3/2005 | Kasako et al. | 711/162 |
| 2005/0210078 A1* | 9/2005 | Maruyama et al. | 707/202 |
| 2006/0059207 A1* | 3/2006 | Hirsch et al. | 707/201 |
| 2006/0182050 A1* | 8/2006 | Dohm | 370/312 |
| 2007/0198690 A1* | 8/2007 | Kodama | 709/223 |
| 2007/0276925 A1* | 11/2007 | La Joie et al. | 709/219 |
| 2008/0096605 A1* | 4/2008 | Gissin et al. | 455/556.2 |
| 2008/0263276 A1* | 10/2008 | Eng et al. | 711/114 |

FOREIGN PATENT DOCUMENTS

| | | | |
|---|---|---|---|
| JP | 2002-312225 | A | 10/2002 |
| JP | 2002312225 | A | 10/2002 |
| JP | 2004192602 | A | 7/2004 |
| JP | 200531804 | A | 2/2005 |

(Continued)

OTHER PUBLICATIONS

Japanese Office Action dated Dec. 4, 2012 corresponding to Japanese Patent Application No. 2008-001241.

*Primary Examiner* — Rupal Dharia
*Assistant Examiner* — Mohammed Ahmed
(74) *Attorney, Agent, or Firm* — Sughrue Mion, PLLC

(57) ABSTRACT

Provided are a content transfer system, a content transfer method, and a home server capable of backing up all backup target contents without having to transfer all backup target contents. This content transfer system includes a home storage and an online storage. The home storage transfers identifying information of a backup target content to the online storage and requests the online storage to determine the existence of a content that is identical to the backup target content upon requesting the online storage to back up the backup target content, transfers metadata to the online storage when an identical content exists in the online storage, and transfers the backup target content to the online storage in all other cases.

14 Claims, 28 Drawing Sheets

(56) References Cited

FOREIGN PATENT DOCUMENTS

| JP | 2005234909 A | 9/2005 |
| JP | 2006-6908 * | 1/2006 | ............. G06F 12/00 |
| JP | 2007-188377 A | 7/2007 |
| JP | 2007188377 A | 7/2007 |

* cited by examiner

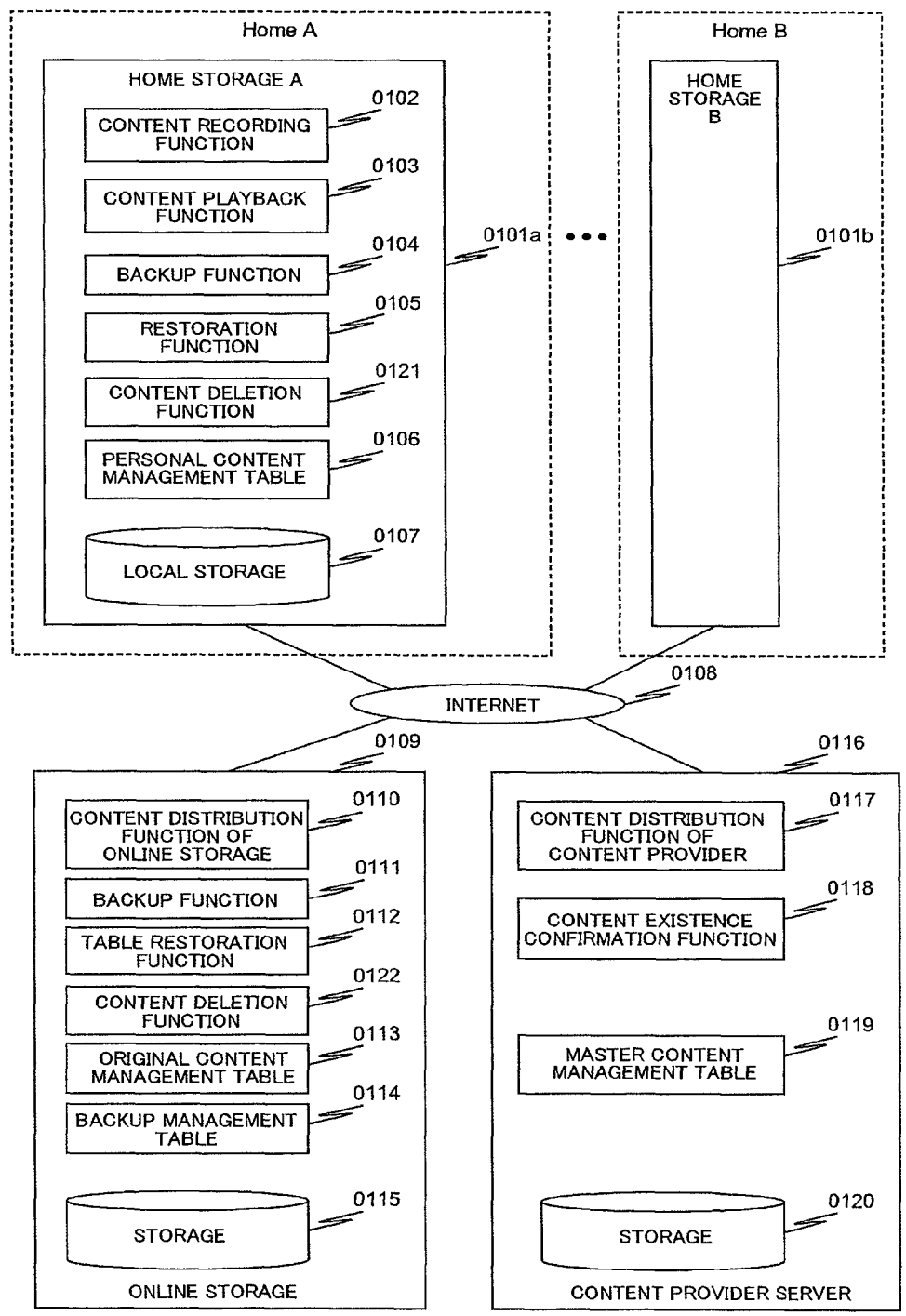

FIG.2

| # | CATEGORY | SOURCE | RECORDING START TIME | RECORDING END TIME | FORMAT | BIT RATE | STORAGE LOCATION |
|---|---|---|---|---|---|---|---|
| 1 | TERRESTRIAL DIGITAL BROADCASTING | 1ch | 2007/9/20 10:00:00 | 2007/9/20 11:00:00 | AVI | 60Mbps | DIR1/FILE001 |
| 2 | BS | 2ch | 2007/9/21 20:00:00 | 2007/9/21 20:30:00 | MPEG | 30Mbps | DIR2/FILE002 |
| 3 | BS | 2ch | 2007/9/21 20:30:00 | 2007/9/21 21:00:00 | MPEG | 1.5Mbps | DIR3/FILE003 |
| 4 | ONE-SEGMENT BROADCASTING | 3ch | 2007/9/22 07:01:00 | 2007/9/22 11:28:00 | WMV | 1.5Mbps | DIR/4FILE004 |
| 5 | DVD | 0001 | 00:00:00 | 02:00:00 | MPEG2 | 10Mbps | DIR5/FILE005 |
| 6 | CD | 0002_Track_01 | 00:00:00 | 00:03:00 | MP3 | 600Kbps | DIR6/FILE006 |
| 7 | Web | hitachi.com/content003 | 00:00:00 | 00:30:00 | FLV | 300Kbps | DIR7/FILE007 |
| ‥‥ | ‥‥ | ‥‥ | ‥‥ | ‥‥ | ‥‥ | ‥‥ | ‥‥ |

FIG.3

| # | USER NAME 0301 | CONTENT BASIC INFORMATION 0312 |||||||| METADATA 0313 |||
|---|---|---|---|---|---|---|---|---|---|---|---|
| | | CATEGORY 0303 | SOURCE 0304 | RECORDING START TIME 0305 | RECORDING END TIME 0306 | FORMAT 0307 | BIT RATE 0308 | UNVIEWED FLAG 0309 | VIEW COUNT 0310 | DESCRIPTION 0311 |
| 1 | Kodama | TERRESTRIAL DIGITAL BROADCASTING | 1ch | 2007/9/20 10:30:00 | 2007/9/20 10:50:00 | MPEG | 1.5Mbps | ON | 0 | "DEAR FRIEND," COMEDY, STARRING MICHAEL NIXON |
| 2 | Hitachi | BS | 2ch | 2007/9/21 20:00:00 | 2007/9/21 21:00:00 | MPEG | 1.5Mbps | OFF | 10 | "MOBILE SOLDIER GUNDAWN, ANIMATION, VOICE ACTOR: AKIRA FURUYA |
| 3 | Furukawa | CD | 0002_Track_01 | 00:00:00 | 00:03:00 | MP3 | 128Kbps | OFF | 100 | "WHAT ENERGY IS THIS ENERGY!!!?" JINGLE, SINGER: YAMUCHA |
| •••• | •••• | •••• | •••• | •••• | •••• | •••• | •••• | •••• | •••• | •••• |

FIG.4

| # | CONTENT BASIC INFORMATION ||||||| METADATA ||| STORAGE LOCATION | BACKUP TIME |
|---|---|---|---|---|---|---|---|---|---|---|---|
| | CATEGORY 0403 | SOURCE 0404 | RECORDING START TIME 0405 | RECORDING END TIME 0406 | FORMAT 0407 | BIT RATE 0408 | UNVIEWED FLAG 0409 | VIEW COUNT 0410 | DESCRIPTION 0411 | 0414 | 0415 |
| 1 | TERRESTRIAL DIGITAL BROADCASTING | 1ch | 2007/9/20 10:30:00 | 2007/9/20 10:50:00 | MPEG | 1.5Mbps | ON | 0 | "IT'S SPICY BEING A MAN," COMEDY, STARRING MICHAEL NIXON | DIR0/FILE00X | 2007/9/22 00:00:00 |
| 2 | BS | 2ch | 2007/9/21 20:00:00 | 2007/9/21 21:00:00 | MPEG | 1.5Mbps | OFF | 10 | "MOBILE SOLDIER GUNDAWN," ANIMATION, VOICE ACTOR : AKIRA FURUYA | OnlineStorage 01 | 2007/9/22 00:00:01 |
| 3 | CD | 0002_Track_01 | 00:00:00 | 00:03:00 | MP3 | 128Kbps | OFF | 100 | "WHAT ENERGY IS THIS ENERGY!!!?" JINGLE, SINGER : YAMUCHA | DIR1/FILE00Y | UNIMPLEMENTED |
| ... | ... | ... | ... | ... | ... | ... | ... | ... | ... | ... | ... |

| TYPE OF REQUEST | READ CONTENT | 0701 |
| --- | --- | --- |
| USER NAME | Kodama | 0702 |
| CATEGORY | TERRESTRIAL DIGITAL BROADCASTING | 0703 |
| SOURCE | 1ch | 0704 |
| RECORDING START TIME | 2007/9/20 10:30:00 | 0705 |
| RECORDING END TIME | 2007/9/20 10:50:00 | 0706 |
| FORMAT | MPEG | 0707 |
| BIT RATE | 300Kbps | 0708 |

FIG.9

| TYPE OF REQUEST | SEND CONTENT BASIC INFORMATION |
|---|---|
| USER NAME | Kodama |
| CATEGORY | TERRESTRIAL DIGITAL BROADCASTING |
| SOURCE | 1ch |
| RECORDING START TIME | 2007/9/20 10:30:00 |
| RECORDING END TIME | 2007/9/20 10:50:00 |
| FORMAT | MPEG |
| BIT RATE | 300Kbps |

FIG.10

| TYPE OF REQUEST | SEND METADATA |
|---|---|
| USER NAME | Kodama |
| IDENTIFIER | abcdefg |
| UNVIEWED FLAG | ON |
| VIEW COUNT | 0 |
| DESCRIPTION | "DEAR FRIEND," COMEDY, STARRING MICHAEL NIXON |

FIG.16

| TYPE OF REQUEST | ISSUE CONTENT EXISTENCE CONFIRMATION REQUEST | 1601 |
|---|---|---|
| CATEGORY | TERRESTRIAL DIGITAL BROADCASTING | 1602 |
| SOURCE | 1ch | 1603 |
| RECORDING START TIME | 2007/9/20 10:30:00 | 1604 |
| RECORDING END TIME | 2007/9/20 10:50:00 | 1605 |
| FORMAT | MPEG | 1606 |
| BIT RATE | 300Kbps | 1607 |

FIG.25

| # | USER NAME | CONTENT BASIC INFORMATION ||| METADATA |||
|---|---|---|---|---|---|---|---|
| | | CONTENT ID | FORMAT | BIT RATE | UNVIEWED FLAG | VIEW COUNT | DESCRIPTION |
| 1 | Kodama | ABC001 | MPEG | 1.5Mbps | ON | 0 | "IT'S SPICY BEING A MAN," COMEDY, STARRING MICHAEL NIXON |
| 2 | Hitachi | XYZ002 | MPEG | 1.5Mbps | OFF | 10 | "MOBILE SOLDIER GUNDAWN," ANIMATION, VOICE ACTOR : AKIRA FURUYA |
| 3 | Furukawa | PQR003 | MP3 | 128Kbps | OFF | 100 | "WHAT ENERGY IS THIS ENERGY!!!?," JINGLE, SINGER : YAMUCHA |
| •••• | | | | | | | •••• |

FIG.26

| # | CONTENT ID | FORMAT | BIT RATE | STORAGE LOCATION |
|---|---|---|---|---|
| 1 | ABC001 | AVI | 60Mbps | DIR1/FILE001 |
| 2 | XYZ002 | MPEG | 30Mbps | DIR2/FILE002 |
| 3 | PQR003 | MPEG | 1.5Mbps | DIR3/FILE003 |
| ⋮ | ⋮ | ⋮ | ⋮ | ⋮ |

FIG.27

| # | CONTENT ID | FORMAT | BIT RATE | DESCRIPTION | STORAGE LOCATION |
|---|---|---|---|---|---|
| 1 | ABC001 | AVI | 80Mbps | "IT'S SPICY BEING A MAN," COMEDY, STARRING MICHAEL NIXON | DIR4/ FILE004 |
| 2 | XYZ002 | MPEG | 40Mbps | "MOBILE SOLDIER GUNDAWN,"ANIMATION, VOICE ACTOR: AKIRA FURUYA | DIR5/ FILE005 |
| 3 | PQR003 | MPEG | 2.5Mbps | "WHAT ENERGY IS THIS ENERGY!!?," JINGLE, SINGER : YAMUCHA | DIR6/ FILE006 |
| •••• | •••• | •••• | •••• | •••• | •••• |

X113

X501  X502  X503  X504  X505  X506

CONTENT TRANSFER SYSTEM, CONTENT TRANSFER METHOD AND HOME SERVER

CROSS REFERENCES

This application relates to and claims priority from Japanese Patent Application No. 2007-273077, filed on Oct. 19, 2007 Oct. 25, 2007 and Japanese Patent Application No. 2008-001241, filed on Jan. 8, 2008, the entire disclosure of which is incorporated herein by reference.

BACKGROUND

The present invention relates to content transfer technology capable of reducing the amount of usage fees to be paid for the connection bandwidth required by a first storage for connecting to a communication network by reducing the data transfer volume from the first storage to a second storage when the first storage requests the second storage to back up contents via the communication network.

In recent years, the data size of contents is increasing pursuant to the improvement in quality of video contents such as TV programs and movies being broadcast. Even households are now able to purchase and use large-capacity storages of several TB inexpensively, and record large volumes of video contents and accumulate such contents in a home storage.

Japanese Patent Laid-Open Publication No. 2005-31804 discloses a system connecting an online storage in a content storage service site that accumulates contents uploaded by users from domestic music servers, home servers, TVs and so on, and a billing and settlement service provider that offers billing and settlement service in collaboration with a download site via the Internet.

In addition, Japanese Patent Laid-Open Publication No. 2004-192602 discloses technology of automatically recovering lost data by using data that is backed up in a portal server when a home server malfunctions. This is achieved through performing data backup by periodically transferring data that is updated and accumulated in the home server, which controls and manages a home network connected to a plurality of household electrical appliances, to the portal server connected via the Internet.

Meanwhile, an online storage service is becoming popular as a new type of online service. This service is a storage capacity rental service that can be used via the Internet, and is provided for a fee or free of charge. For instance, by copying the domestic contents to an online storage, such contents can be backed up. Since the contents on the home storage side can be deleted by migrating such contents to the online storage, it is also possible to increase the unused storage capacity on the home storage side.

A domestic home storage is connected to the Internet by using a line that the user subscribed to the telecommunications carrier. The broadbandization of these lines now enables users to use a broad bandwidth of several Mbps to several ten Mbps. Nevertheless, although the data download speed of the domestic line connected to the Internet is fast, the speed of uploading data to an online server is slow. This is because the primary objective of using the Internet in homes was to download contents.

When backing up the video contents that are accumulated daily in the home storage in an online storage via the Internet, there is a problem in that the recorded data cannot be all backed up since the bandwidth of the uploading side of the line is narrow. For example, if 20 GB of video contents are once recorded and such contents are to be backed up using a line having an upload speed of 1.5 Mbps, it would take 30 hours to fully back up the foregoing video contents, and the system would fail since the backup cannot be completed in a single day.

Conventionally, technology for overcoming this problem depended on compressing the transmitted data or sending only critical data.

SUMMARY

Nevertheless, the compression of transmitted data entails problems in that the data compression rate cannot be increased in since the video contents have already been compressed, and it is necessary to lower the quality of the video data in order to increase the data compression rate.

Moreover, it is not possible to back up all data with the method of backing up only critical data.

Thus, an object of the present invention is to provide a content transfer system, a content transfer method, and a home server capable of backing up all backup target contents without having to transfer all backup target contents merely by transferring data of the backup target contents via a communication network under certain conditions.

The present invention focused attention on the fact that, when a user wishes to back up contents such as TV programs, movies, or purchased songs, these contents are owned by a plurality of users. In other words, among such plurality of users, if even one user has backed up a content in a backup storage and another user wishes to back up the same content, the same content already exists in the backup storage.

Thus, when a user using a first storage requests a second storage as a backup storage to back up such user's backup target content, the first storage transfers identifying information of the backup target content to the second storage and requests the second storage to determine the existence of a content corresponding to the backup target content. When a content corresponding to the backup target content exists in the second storage, the first storage transfers management information to be used for managing the backup of the backup target content to the second storage in substitute for transferring the backup target content. The first storage transfers the backup target content to the second storage only under certain conditions where a content corresponding to the backup target content does not exist in the second contents.

Accordingly, since the backup target content is transferred using the upload line of the communication network only when a content corresponding to the backup target content does not exist in the second storage, the objective can be attained even if the bandwidth of the upload line of the communication network is narrow.

According to the present invention, all backup target contents can be backed up without having to transfer all such backup target contents.

DESCRIPTION OF DRAWINGS

FIG. 1 is a configuration diagram of a content transfer system showing an embodiment of the present invention;

FIG. 2 is a configuration diagram of an original content management table;

FIG. 3 is a configuration diagram of a backup management table;

FIG. 4 is a configuration diagram of a personal content management table;

FIG. 7 is a configuration diagram of a content read request format;

FIG. 9 is a configuration diagram of a content basic information sending format;

FIG. 10 is a configuration diagram of a metadata sending format;

FIG. 16 is a configuration diagram of a content existence confirmation request format;

FIG. 25 is a backup management table managed by an online storage;

FIG. 26 is an original content management table managed by the online storage;

FIG. 27 is a master content management table managed by a content provider server;

DETAILED DESCRIPTION

First Embodiment

Figure 5A:
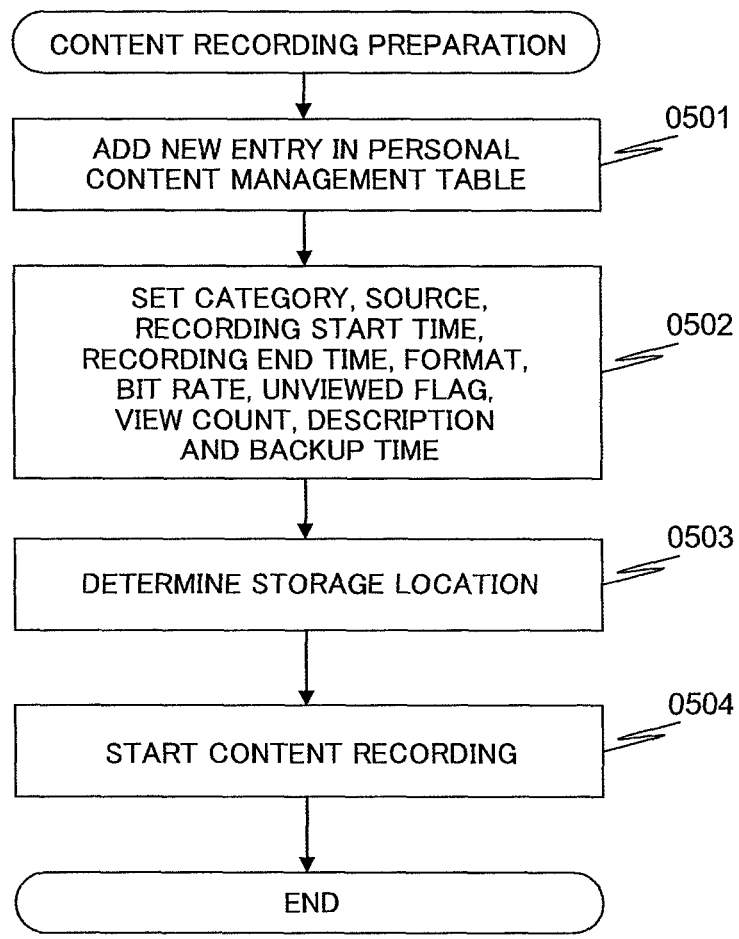
FIGS. 5A and 5B are flowcharts explaining content recording preparation/completion processing.

A content transfer system pertaining to the first embodiment of the present invention is now explained with reference to the attached drawings.

FIG. 1 shows the outline of this content transfer system.

The content transfer system is configured from home storages 0101a, 0101b, an online storage 0109, a content provider server 0116, and an Internet 0108 for connecting the foregoing components via a network.

The home storages 0101a, 0101b are configured as a computer to be used as a first storage (storage apparatus) or a home server for recording first contents, and to be used by a user for recording, accumulating and viewing TV programs, or commanding the backup or restoration of contents to the online storage 0109. Although not shown in FIG. 1, the home storages 0101a, 0101b comprise interfaces such as a display and a remote control, and are connected to the Internet 0108 with a network interface card.

The home storages 0101a, 0101b comprise a content recording function 0102, a content playback function 0103, a backup function 0104, a restoration function 0105, a content deletion function 0121, and a storage 0107 for accumulating data such as contents, and further include a personal content management table 0106 for managing the contents in the storage or the contents in the online storage.

The online storage 0109 has a function of recording the second contents, as well as a function of storing, as the second storage or management server (online server) for managing the first contents of the home storages 0101a, 0101b, contents sent from the home storages 0101a, 0101b, or restoring the backed up contents to the home storage side based on a request from the home storages 0101a, 0101b. The online storage 0109 may sometimes acquire and store contents from the content provider server 0116.

The online storage 0109 comprises a content distribution function 0110 of the online storage 0109, a backup function 0111, and a table restoration function 0112, and stores the contents read from the online storage 0109 to the home storages 0101a, 0101b or the content provider server 0116 in the storage 0115. The online storage 0109 further comprises an original content management table 0113 for managing the contents stored in the storage 0115, and a backup management table 0114 for managing the backup contents sent from the home storages 0101a, 0101b.

The content provider server 0116 is configured as a third storage for retaining third contents, or a server for distributing contents to the home storages 0101a, 0101b. This distribution of contents corresponds to the broadcasting of TV programs by broadcasting companies and the distribution of contents via an online server. Nevertheless, in the case of broadcasting TV programs, the distribution of contents to the home storage does not require the use of the Internet. Means such as terrestrial digital broadcasting or one-segment broadcasting may also be used. In addition, the content provider server 0116 does not necessarily have to be connected to the Internet 0108 in this invention.

The content provider server 0116 comprises a content distribution function 0117 of the content provider 0116, a content existence confirmation function 0118, and a master content management table 0119 for managing the contents in the storage, and stores the contents to be distributed to the home storages 0101a, 0101b in the storage 0120.

The differentiation in the use of the term "contents" is as follows. In other words, the term "contents" as used in a normal text refers to the contents stored in the home storages 0101a, 0101b. The term "original contents" refers to the contents stored in the online storage 0109. The term "master contents" refers to the contents stored in the content provider server 0116.

Master contents are the contents that are stored in the highest quality format and bit rate. The content provider server 0116 broadcasts the master contents by converting such master contents into a format and bit rate compatible for broadcast to the home server. The home server stores the received contents by converting such received contents into a format and bit rate compatible for storage in the storage. When backing up the contents, the contents stored in the storage are sent to the online storage 0109.

The original contents are the contents that were backed up by the home storages 0101a, 0101b as the home server. These contents contain the same subject matter, and there are a plurality of contents that differ only with respect to the format and bit rate, and the recording start time and recording end time. When backing these contents up from the home storages 0101a, 0101b to the online storage 0109, the online storage side only stores the contents having the highest quality format and bit rate among the foregoing contents.

FIG. 2 shows an example of the original content management table 0113 managed by the online storage 0109. The original content management table 0113 is a table for managing information concerning the original contents stored in the online storage 0109, and manages information such as an entry number 0201, a category 0202, a source 0203, a recording start time 0204, a recording end time 0205, a format 0206, a bit rate 0207, and a storage location 0208 for each of the stored original contents. The contents are identified based on the category 0202, the source 0203, the recording start time 0204, and the recording end time 0205.

If the content is a recorded TV program, the same content is broadcast to all users at the same time. Thus, if there are two contents in which the broadcasting category, such as terrestrial digital broadcasting or one-segment broadcasting, the channel number, and the start time and end time of the program coincide, the subject matter of these two contents can be considered to be the same. Thus, the foregoing types of information are used to identify the subject matter of the contents.

For example, if the content is a movie ripped from a DVD, the category 0202 will be the ID for identifying the DVD, and the source 0203 will be the ID for identifying the movie. Here, as the recording start time 0204 and the recording end time 0205, the start time of the movie is set to 00, and the end time is set to a relative time starting from 00. If the content is music ripped from a CD, the category 0202 will be the ID for identifying the CD, and the source 0203 will be the combined information of the ID for identifying the CD album and the track number in that album. Here, as the recording start time 0204 and the recording end time 0205, the start time of one song (1 track worth) is set to 00, and the end time is set to a relative time starting from 00.

The format 0206 and the bit rate 0207 show the recording format of the content and the data compression rate when storing such content. These categories affect the picture quality of the contents. If the bit rate 0207 is low, it means that the quality is inferior. Although it is possible to convert a content having a high bit rate 0207 into a content having a low bit rate 0207, it is not possible to go the other way around. There are the following relationships concerning the picture quality among different types of formats. This will be explained later with reference to FIG. 19. Finally, the storage location 0208 shows under what file name the content is being stored in the storage 0115 of the online storage 0109.

FIG. 3 shows an example of the backup management table 0114 managed by the online storage 0109. The backup management table 0114 is a table for managing which user backed up which content in which format or bit rate. Since the metadata 0313 of the content is also stored together with the actual content, the backup management table 0114 also manages the subject matter of the backed up metadata 0313.

Specifically, the backup management table 0114 manages information such as an entry number 0301; a user name 0302; a category 0303, a source 0304, a recording start time 0305, a recording end time 0306, a format 0307, and a bit rate 0308 as content basic information 0312; and an unviewed flag 0309, a view count 0310, and a description 0311 as metadata 0313. Here, one entry corresponds to each of the backed up contents, and the user name 0302 is information for identifying the user who backed up the content. The category 0303, the source 0304, the recording start time 0305, and the recording end time 0306 are information for identifying the content. The format 0307 and the bit rate 0308 are for recording the type of format and bit rate in which the content backed by the user is being stored.

What requires attention here is that the recording start time 0305 and the recording end time 0306 of the backed up content do not necessarily coincide with the recording start time and the recording end time of the original content, and the relationship is such that the recording time of the original content always includes the backed up content.

Nevertheless, there are cases where the backed up content is divided into a plurality of original contents. In addition, the picture quality of the original content is always better than the picture quality of the backed up content. If the picture quality of the backed up content is inferior to the picture quality of the original content, by converting the quality of the original content into the quality recorded in the backup management table 0114 upon backing up or distributing such backup content on the home storage side, the user will be able to view the content in the same picture quality as the time it was backed up.

Metadata 0313 includes, but is not limited to, an unviewed flag 0309 showing whether the user played the video content, a view count 0310 showing how many times the user played the same content, and explanatory information 0311 concerning the subject matter of the contents. Information concerning contents that can be received with an EPG (Electronic Program Guide) may also be included as metadata.

Since the backup management table 0114 is used for the purpose of managing who backed up which content in what quality, it does not manage with which file of the storage the substance of the content corresponds. The online storage 0109 is able to know the correspondence with the substance of the content by obtaining identifying information of the content from the backup management table 0114, and finding the original content that coincides with such identifying information from the original content management table 0114.

FIG. 4 shows an example of the personal content management table 0106 managed by the home storages 0101a, 0101b. This table 0106 is used for the purpose of managing which kind of content was stored where (in the home storage or in the online storage) by the user in which kind of format.

The personal content management table 0106 manages information such as an entry number 0401; a category 0403, a source 0404, a recording start time 0405, a recording end time 0406, a format 0407, and a bit rate 0408 as content basic information 0412; and an unviewed flag 0409, a view count 0410, and a description 0411 as metadata 0413; and finally a storage location 0414 and a backup time 0415. The configuration of the content basic information and metadata is the same as with the backup management table 0114, and the explanation thereof is omitted.

The storage location 0414 shows whether the content is stored in the home storages 0101a, 0101b or in the online storage 0109. If the content is stored in the home storages 0101a, 0101b, the storage location shows under which file name the content is stored in the storage 0107 of the home storages 0101a, 0101b. If the content is stored in the online storage 0109, information (host name, etc.) for identifying the online storage 0109 is entered in the storage location column. The backup time 0415 shows whether the content has been backed up and, if so, the time that the content was backed up. If the content has not yet been backed up, "Uncompleted" is entered in the backup time column. "Uncompleted" is also indicated when the content is updated.

FIG. 5A shows the processing flow of the content recording function 0102 of the home storage 0101a recording a content in the storage. This flow is called at the start of recording by the user or a pre-set recording schedule.

At step 0501, the home storage (computer) 0101a adds a new entry to the personal content management table 0106. At step 0502, the home storage 0101a records the category 0403, the source 0404, the recording start time 0405, the format 0407, the bit rate 0408, the unviewed flag 0409, the view count 0410, the description 0411, and the backup time 0415 of the content to be recorded in the personal content management table 0106. The category 0403, the source 0404, the recording start time 0405, the format 0407, and the bit rate 0408 are set based on information concerning the recording schedule. The unviewed flag 0409 is ON, the view count 0410 is zero, the description 0411 uses EPG information, and the backup time 0415 is "Uncompleted."

At step 0503, the home storage 0101a determines a unique file name to be used upon storing the content as a file in the local storage 0107, and enters the file name in the storage location column 0414 of the personal content management table 0106. At step 0504, the home storage 0101a starts the recording of the content. The received video is converted into the designated format and bit rate, and then data is written into the file.

Figure 5B:
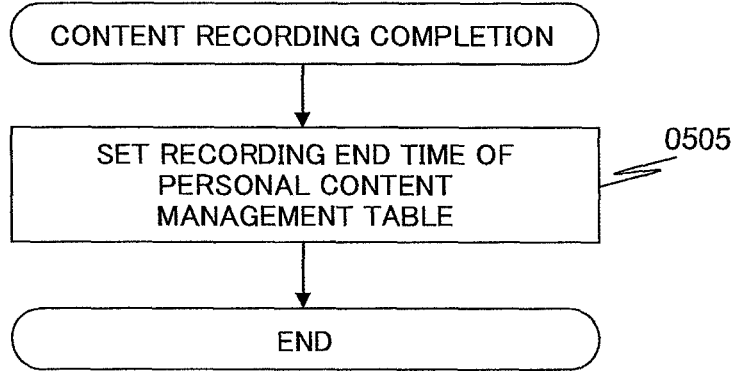

FIG. 5B shows the processing flow of the content recording function 0102 for the home storage 0101a to end the recording of the contents. This flow is called at the end of recording by the user or a pre-set recording schedule.

At step 0505, the home storage 0101a sets the recording end time 0406 of the personal content management table 0106 to the current time.

Figure 6:
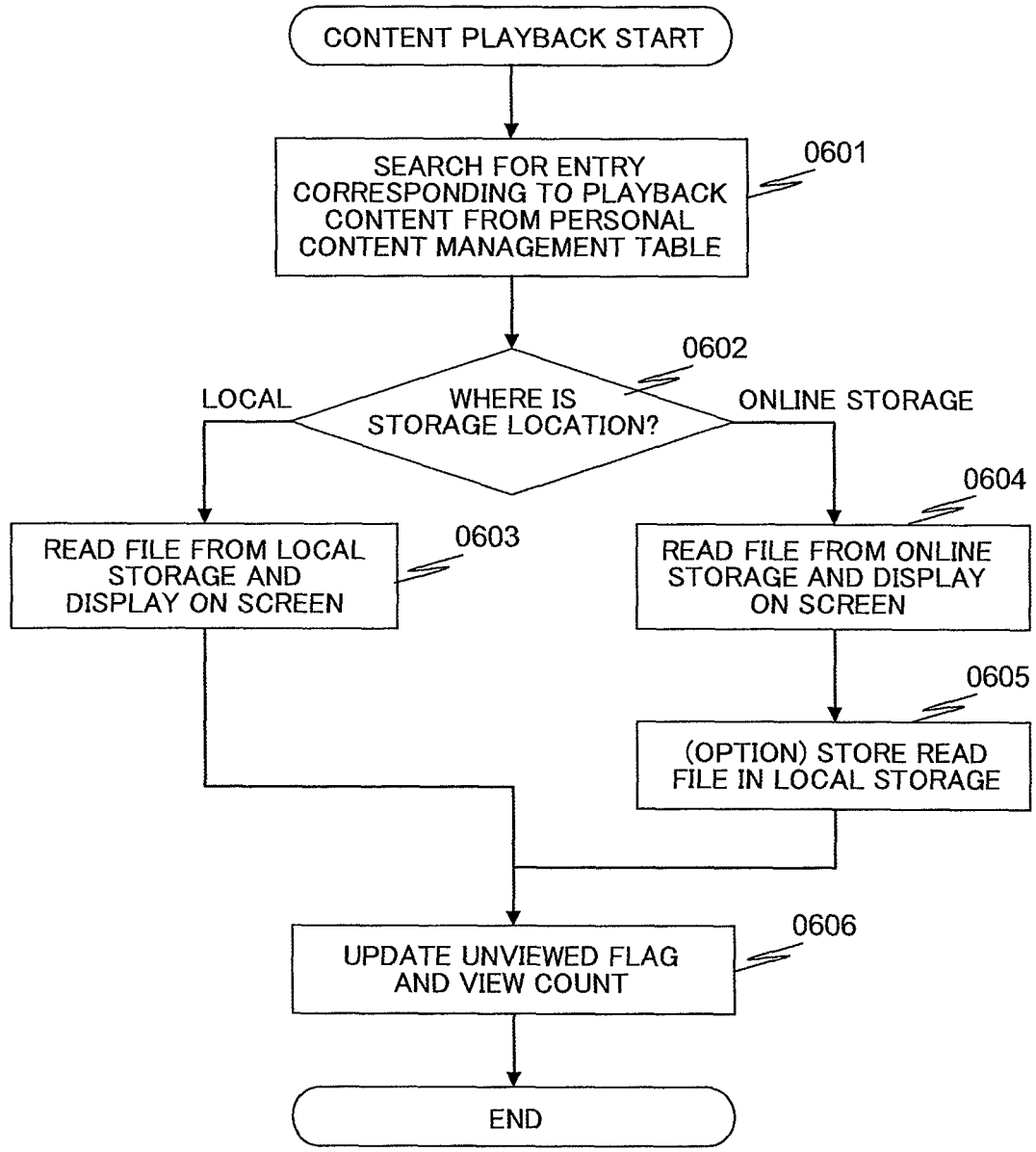
FIG. 6 is a flowchart explaining content playback processing.

FIG. 6 shows the processing flow of the content playback function 0103 for the home storage 0101a to play the content on a display in response to the user's request. This flow is started by the home storage 0101a displaying a list of contents created based on the personal content management table 0106 on a display, and the user selecting the content to be viewed using a remote control or the like.

At step 0601, the home storage (computer) 0101a searches for an entry corresponding to the content to be played from the personal content management table 0106. At step 0602, the home storage 0101a refers to (determines) the storage location of the entry, and proceeds to step 0603 if the storage location is the local storage 0107, and proceeds to step 0604 if the storage location is the online storage 0109.

At step 0603, the home storage 0101a reads the file indicated in the storage location from the local storage 0107, displays the content thereof on a display, and thereafter proceeds to step 0606. At step 0604, the home storage 0101a issues a content read request to the online storage 0109. The home storage 0101a thereby receives the corresponding content. The home storage 0101a displays the received content on a display.

Step 0605 is an optional step. The home storage 0101a stores the file read from the online storage 0109 in the local storage 0107, and updates the storage location of the personal content management table 0106 with the file name used for storing the content in the local storage 0107

At step 0606, the home storage 0101a turns OFF the unviewed flag 0409 of the personal content management table 0106, and increments the view count 0410 by one.

FIG. 7 shows an example of the format when the home storage 0101a issues a content read request to the online storage 0109 at step 0604 of FIG. 6.

The content read request designates a type of request 0701, a user name 0702, a category 0703, a source 0704, a recording start time 0705, a recording end time 0706, a format 0707, and a bit rate 0708. The type of request 0701 designates "read content." The user name 0702 is a user account name when the home storage 0101a uses the online storage 0109. The category 0703, the source 0704, the recording start time 0705 and the recording end time 0706 are used for the purpose of designating which content is to be read. The format 0707 and the bit rate 0708 designate the kind of format and bit rate to be used for viewing the content. If the content is migrated to the online storage 0109, the content can also be read after converting the quality of such content to a lower quality. Both the recording start time 0705 and the recording end time 0706 can be designated as an arbitrary time frame so as long as it is within the recording start time and recording end time of the migrated content.

Figure 8:
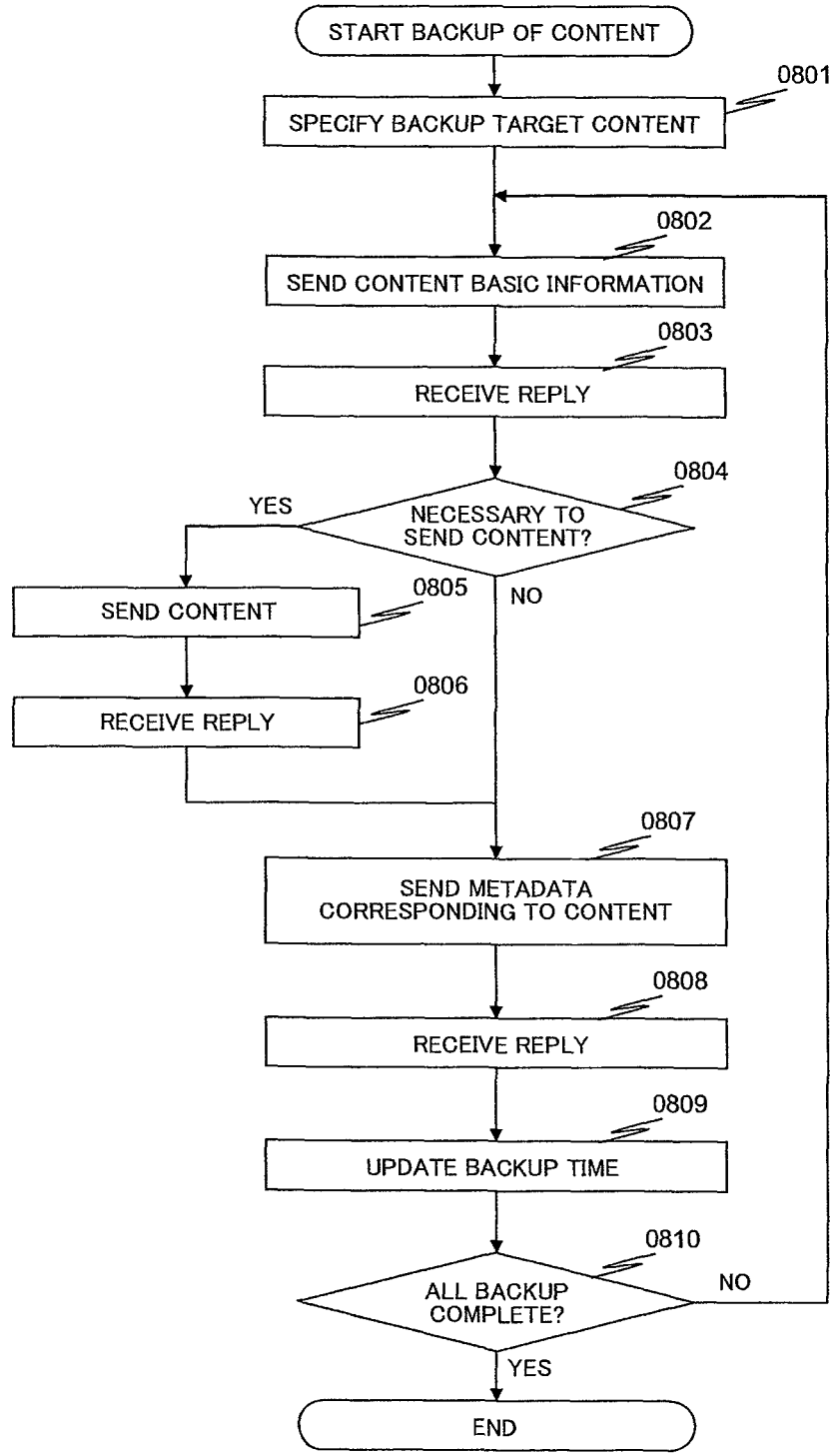
FIG. 8 is a flowchart explaining content backup processing.

FIG. 8 explains the processing flow of the backup function 0104 when the home storage 0101a as the home server backs up the content in the online storage 0109. This processing is called periodically according to the backup scheduler, called at a timing that the content is created, or called by being triggered by the user.

At step 0801, the home storage (computer) 0101a refers to the backup time 0415 regarding all entries of the personal content management table 0106, and extracts entries that are "Uncompleted." These entries will become backup targets. At step 0802, the home storage 0101a sends the content basic information 0412 regarding the respective entries to the online storage 0109. At step 0803, the home storage 0101a receives a reply from the online storage 0109.

At step 0804, the home storage 0101a reads the reply and determines whether it is necessary to send the backup target content to the online storage 0109, and proceeds to step 0805 if it is necessary to send the backup target content, and proceeds to step 0807 if it is not necessary. If it is not necessary to send the backup target content, this implies that the online storage 0109 is already storing the content having the same subject matter. In this case also, since metadata will differ for each individual, only the metadata is backed up.

At step 0805, the home storage 0101a sends the content to the online storage 0109. At step 0806, the home storage 0101a receives a reply from the online storage 0109. At step 0807, the home storage 0101a sends metadata that is associated with the backup target content to the online storage 0109. At step 0808, the home storage 0101a receives a reply from the online storage 0109.

At step 0809, the home storage 0101a updates the backup time 0415 of the relevant entries in the personal content management table 0106 with the current time. At step 0810, the home storage 0101a determines whether the processing of all backup target data is complete and repeats the processing from step 0802 to the subsequent content if the processing is not complete, and ends the processing if the processing is complete.

If the content is migrated, and not backed up, from the home storage 0101a to the online storage 0109, another embodiment of deleting the content from the home storage 0101a at an arbitrary time after the successful backup may also be adopted.

FIG. 9 shows an example of a request format to be used when the home storage 0101a sends the content basic information 0412 to the online storage 0109 at step 0802 of FIG. 8.

The request format for sending the basic information designates a type of request 0901, a user name 0902, a category 0903, a source 0904, a recording start time 0905, a recording end time 0906, a format 0907, and a bit rate 0908. The foregoing information is created from the personal content management table 0106. The type of request is "acquisition of content basic information."

FIG. 10 shows an example of the request format when the home storage 0101a sends metadata of the content to the online storage 0109 at step 0807 of FIG. 8.

This request format designates a type of request 1001, a user name 1002, a backup identifier 1003, an unviewed flag 1115, a view count 1116, a description 1117, and so on.

Figure 11:
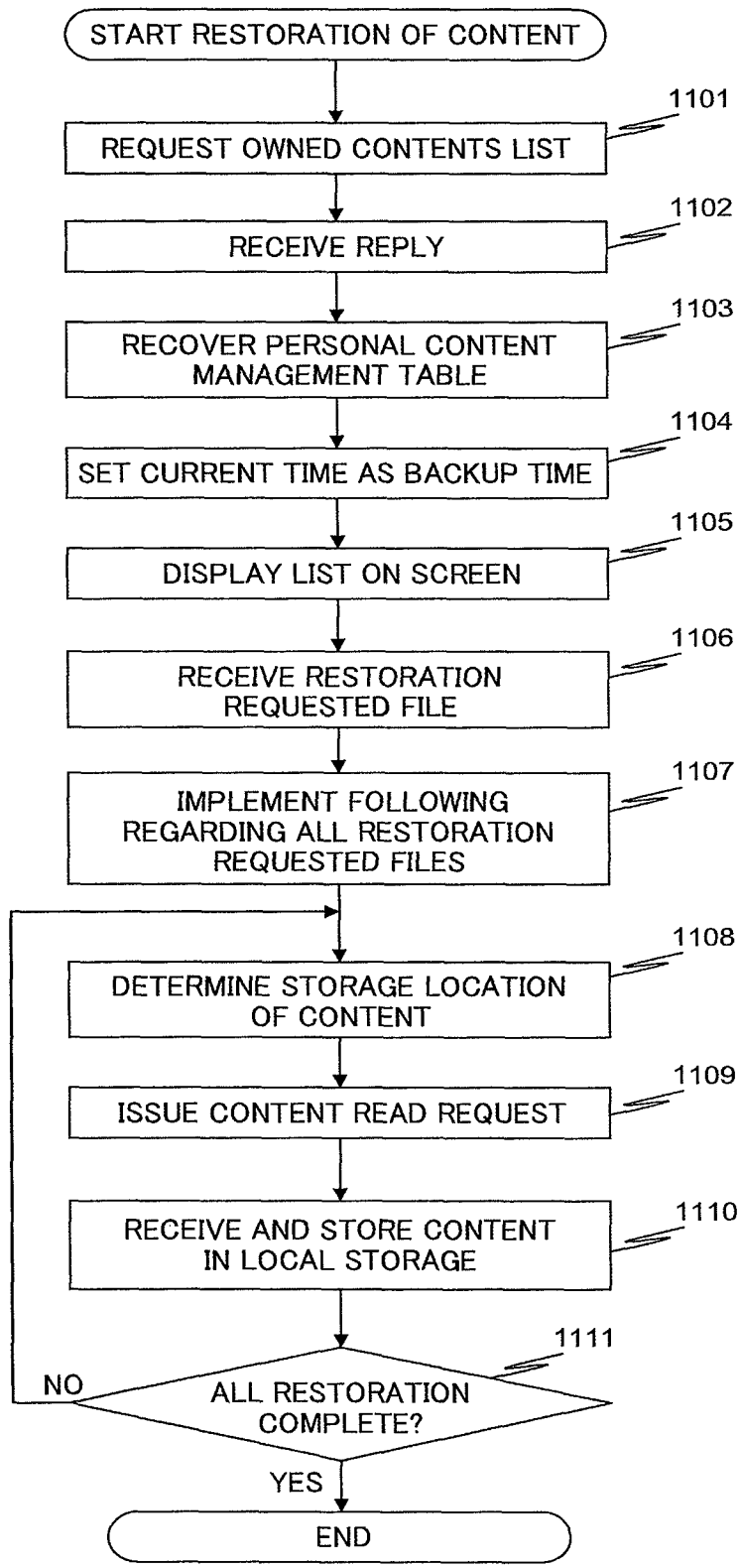
FIG. 11 is a flowchart explaining content restoration processing.

FIG. 11 shows an example of the processing flow of the restoration function 0105 when the home storage 0101a malfunctions and the content is to be restored to a new home storage.

At step 1101, the home storage (computer) 0101a requests the online storage 0109 to send a list of contents that were backed up with the designated user name. At step 1102, the home storage 0109 receives the contents list from the online storage 0101a. At step 1103, the home storage 0109 recovers the personal content management table 0106 based on the received contents list. In doing so, the storage location will be the storage 0115 of the online storage 0109.

At step 1104, the home storage 0101a sets the backup time 0415 of the entry of the restored contents to the current time. At step 1105, the home storage 0101a displays a list of the restoration target contents, and makes the user select the contents to be copied to the local storage 0107.

At step 1106, the home storage 0101a receives a list of the restoration contents selected by the user. The home storage 0101a reads only the designated contents from the online storage 0109 and copies such designated contents to the local storage 0107. At step 1107, the home storage 0101a repeats step 1108 onward concerning all restoration target contents.

At step 1108, the home storage 0101a determines the file name for storing the restoration content as a file in the local storage 0107, and records the determined file name in the storage location of the corresponding entry of the personal content management table 0106.

At step 1109, the home storage 0101a reads the contents to be restored from the online storage 0109. At step 1110, the home storage 0101a stores the received contents in the local storage 0107. At step 1111, the home storage 0101a determines whether all contents have been restored, and repeats step 1108 onward if the restoration is not complete, and ends the processing if the restoration is complete.

Figure 12:
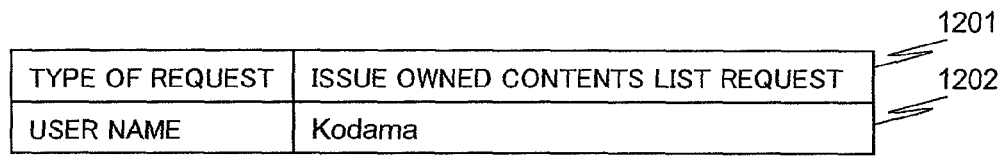
FIG. 12 is a configuration diagram of an owned contents list request format.

FIG. 12 shows an example of the request format for the home storage 0101a to request the online storage 0109 to send a list of its owned contents at step 1101 of FIG. 11.

This request is configured from a type of request 1201 and a user name 1202. The type of request is designated as "owned contents list request." The user name designates the user name designated at the time the content was backed up. The obtained contents list includes all contents stored by that user.

Figure 13:
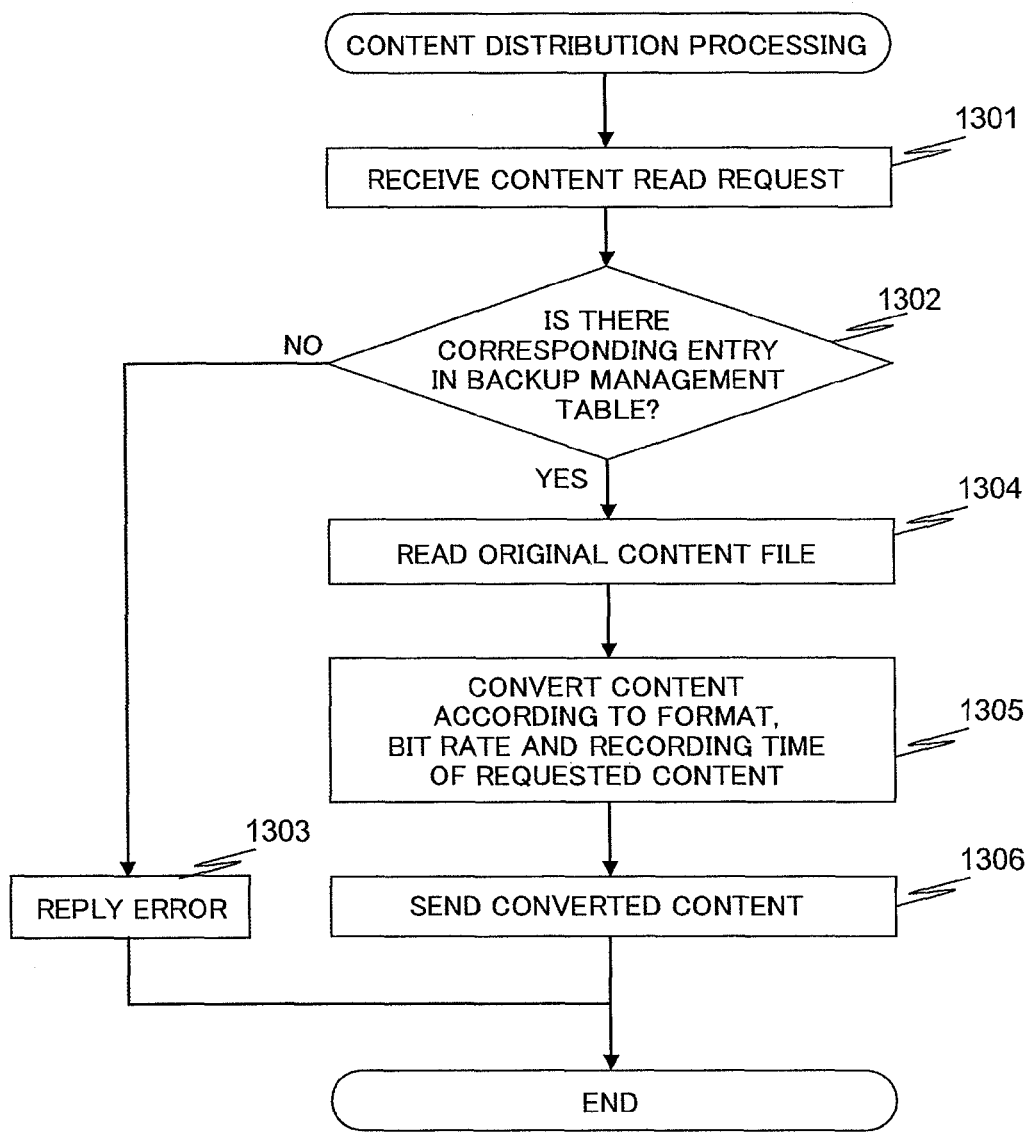
FIG. 13 is a flowchart explaining content distribution processing.

FIG. 13 explains the processing flow of the content distribution function 0110 of the online storage 0109. This processing realizes the function of sending the contents requested by the home storage 0101a to the home storage 0101a.

At step 1301, the online storage 0109 receives a content distribution request from the home storage 0101a (refer to the content read request format of FIG. 7). At step 1302, the online storage 0109 refers to the identifying information (category 0703, source 0704, recording start time 0705, recording end time 0706) of the content designated in the request, and checks whether the relevant entry exists in the backup management table 0114 (whether the user owns the request content).

In the foregoing case, the conditions that must be satisfied are that the category 0703 and the source 0704 and the user name 0702 coincide, the recording start time 0705 and the recording end time 0706 are within the time frame of the recording start time 0305 and the recording end time 0306 of the backup management table 0114, and the picture quality determined by the bit rate 0708 and the format 0707 is lower than the picture quality determined by the bit rate 0308 and the format 0307 of the backup management table 0114.

At step 1303, if there is no relevant entry, the online storage 0109 sends an error reply to the home storage 0101a. At step 13047 the online storage 0109 reads the original content corresponding to the requested content from the storage 0115. At step 1305, the online storage 0109 converts the original content in accordance with the requested format and bit rate. Here, the online storage 0109 may, in substitute for converting the original content in accordance with the requested format and bit rate, change the format and bit rate and use the changed content as the original content in order to make the picture quality of the backed up content to be better than the picture quality at the time of backup.

If the user wishes to view the content with a quality that is higher than the quality at the time of backup, the online storage may also add a step of billing the user. At step 1306, the online storage 0109 sends the converted content to the home storage 0101a.

Figure 14:
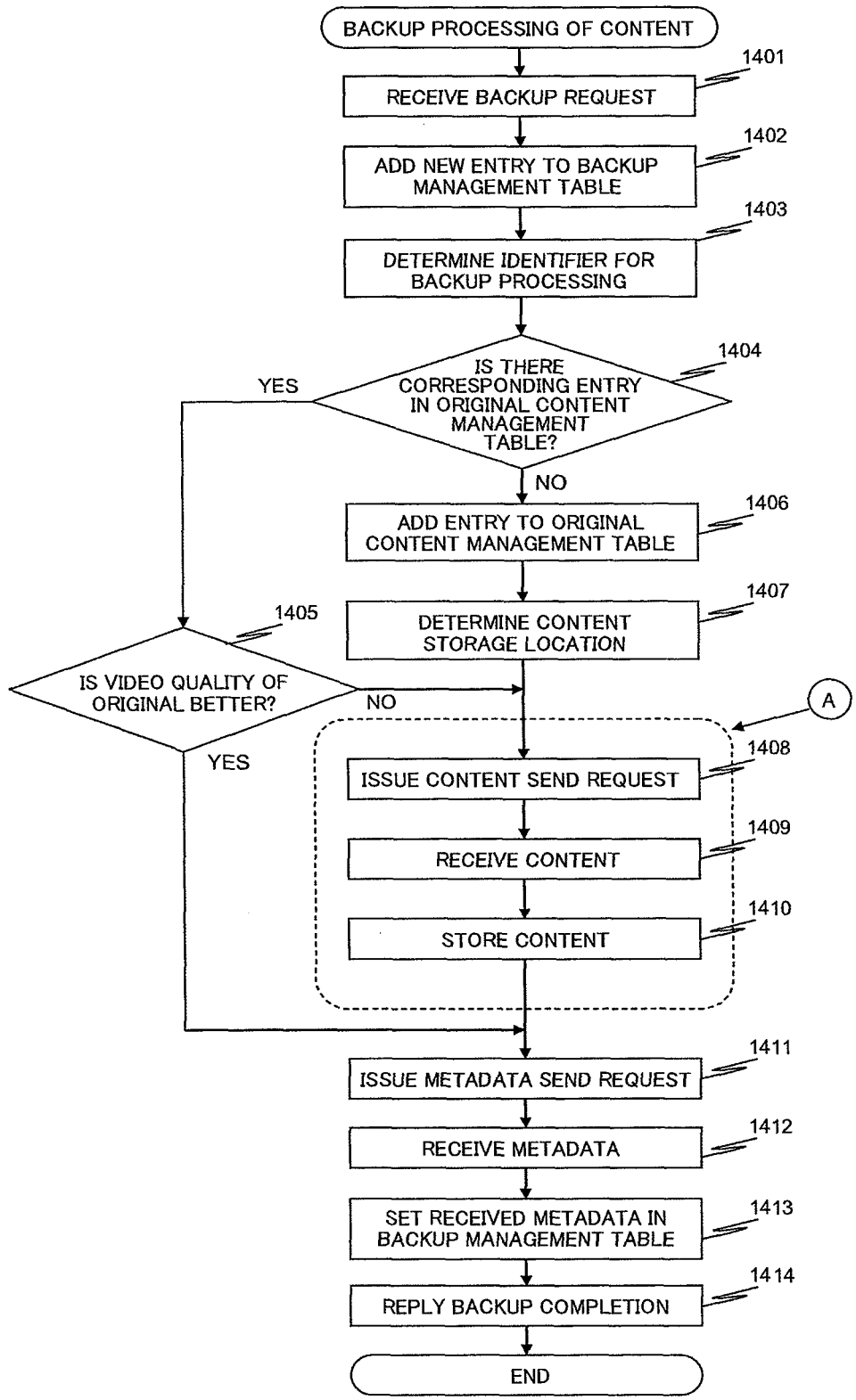
FIG. 14 is a flowchart explaining content backup processing.

FIG. 14 shows the processing flow of the content backup function 0111 in the online storage 0109. This processing determines whether the content requested to be backed up by the home storage 0109 already exists in the online storage 0109 and, if so, does not send the content.

At step 1401, the online storage 0109 receives content basic information from the home storage 0101a (refer to the format for sending content basic information of FIG. 9). At step 1402, the online storage 0109 adds a new entry to the backup management table 0114. In doing so, the online storage 0109 stores information on the user name 0302, the category 0303, the source 0304, the recording start time 0305, the recording end time 0306, the format 0307, and the bit rate 0308 by referring to the content basic information 0312.

At step 1403, the online storage 0109 allocates a unique identifier for performing backup processing in the system. The identifier is an arbitrary value. By using this identifier, the sequential backup processing that is currently subject to processing and the other backup processing are differentiated.

At step 1404, the online storage 0109 refers to the original content management table 0113, determines whether the content to be backed up already exists in the online storage 0109, and proceeds to step 1405 if such content exists, and proceeds to step 1406 if such content does not exist. Here, as described later, the content to be sent from the home storage 0101a as the home server does not have to be full length. Only the portion of the time frame that is missing in the original content needs to be sent.

At step 1404, content basic information is used to determine whether the content to be backed up already exists in the online storage 0109. Nevertheless, there may be cases where the user falsifies the content basic information and reports to the online storage that he/she owns the content at a higher quality than the actual quality of the owned content.

In order to detect this kind of fraud, the online storage requests the home storage to send one or more video frames selected randomly from the owned video content. By comparing the received video frame with the subject matter of the video frame of the corresponding portion of the original content stored in the online storage and confirming the coincidence of the subject matter of all video frames, it is also possible to determine whether the content to be backed up already exists in the online storage 0109. In addition, the home storage and the online storage may mutually conduct authentication to confirm that the online storage is communicating with the correct home storage.

At step 1405, the online storage 0109 compares the quality of the original content and the quality of the backup target content to determine whether the original content is of a better quality, and proceeds to step 1410 if the original content is of a better quality since it is not necessary to transfer the backup target content to the home storage 0101*a*, and proceeds to step 1408 if the original content is of an inferior quality.

At step 1406, the online storage 0109 adds a new entry to the original content management table 0113, and records the category 0202, the source 0203, the recording start 0204, the recording end time 0205, the format 0206, and the bit rate 0207 according to the content basic information.

At step 1407, the online storage 0109 determines the file name for storing the content to be backed up in the storage 0115, and records such file name in the storage location column of the new entry. At step 1408, the online storage 0109 requests the home storage 0101*a* to send the content. At step 1409, the online storage 0109 receives the content. In doing so, a step for confirming whether the format and bit rate of the content are actually correct may be added.

At step 1410, the online storage 0109 stores the content in the storage 0115. At step 1411, the online storage 0109 requests the home storage 0101*a* to send metadata that is associated with the backup target content.

At step 1412, the online storage 0109 receives the metadata from the home storage 0101*a*. At step 1413, the online storage 0109 sets the metadata in the backup management table 0114. At step 1414, the online storage 0109 sends a reply informing the successful backup to the home storage 0101*a*.

Figure 15:
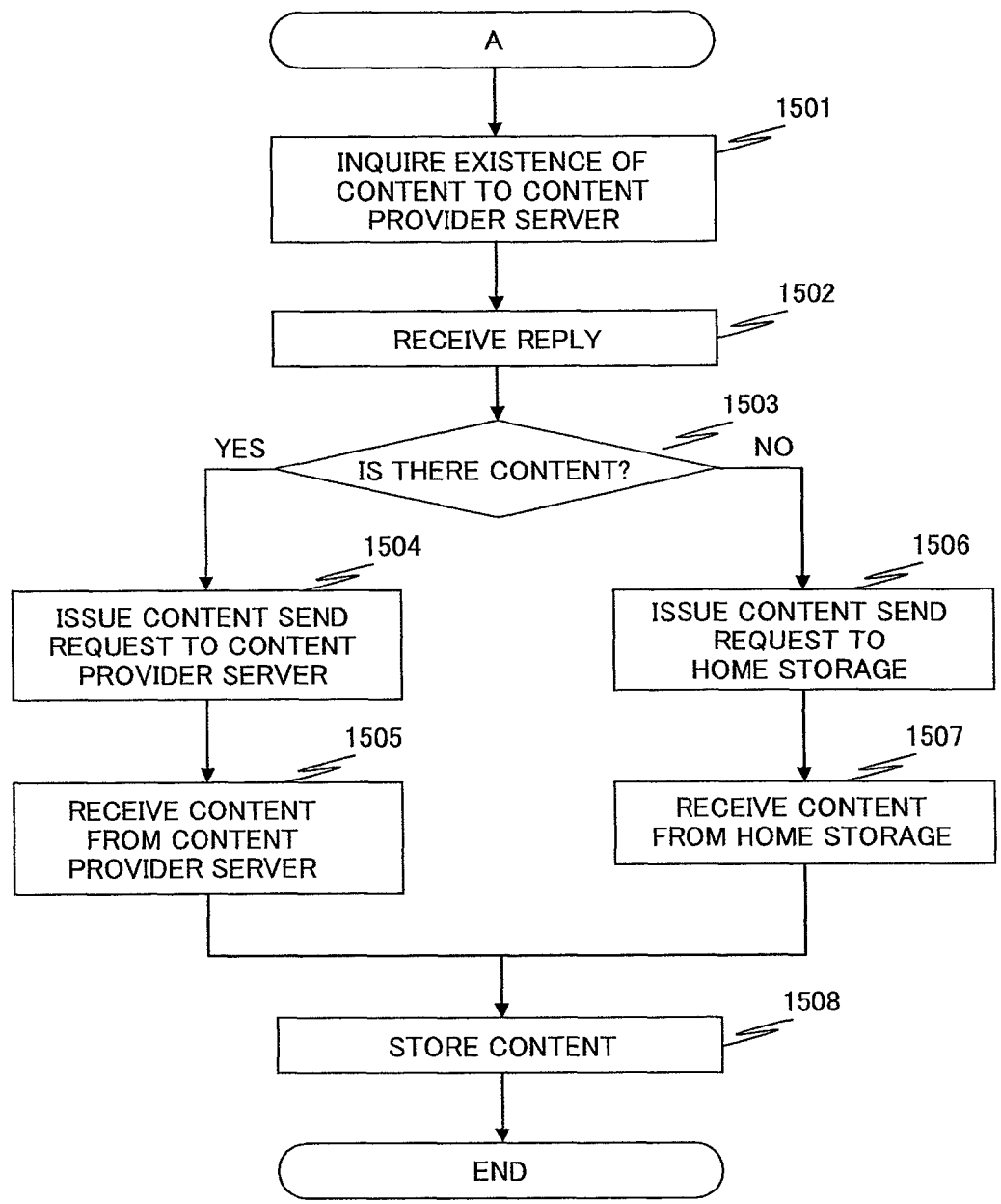
FIG. 15 is a flowchart showing another backup processing.

FIG. 15 shows another embodiment of the processing encompassed with the dotted line indicated as "A" in FIG. 14. In this processing, if there is no original content in the online storage 0109, whether the corresponding content exists in the content provider server 0116 is checked before reading the content from the home storage 0101*a*. If the content exists, the content is read from the content provider server 0116, and not from the home storage 0101*a*. It is thereby possible to conserve the network bandwidth of the home storage 0101*a* as the home server.

At step 1501, the online storage 0109 confirms whether the content provider server 0116 has the content requested to be backed up by the home storage 0101*a*. At step 1502, the online storage 0109 receives a reply form the content provider server 0116.

At step 1503, the online storage 0109 reads the description of the reply, checks whether the content provider server 0116 has the content, and proceeds to step 1504 if the content exists, and proceeds to step 1506 if the content does not exist. At step 1504, the online storage 0109 issues a content read request to the content service provider 0116.

At step 1505, the online storage 0109 receives the content from the content service provider 0116. At step 1506, the online storage 0109 requests the home storage 0101*a* to the send the content.

At step 1507, the online storage 0109 receives the content. At step 1508, the online storage 0109 stores the received content in the storage 0115.

FIG. 16 shows an example of a format to be used by the online storage 0109 for inquiring the existence of the content to the content provider server 0116 at step 1501 of FIG. 15.

This request designates a type of request 1601, a category 1602, source 1603, a recording start time 164, a recording end time 1605, a format 1606, and a bit rate 1607.

Figure 17:
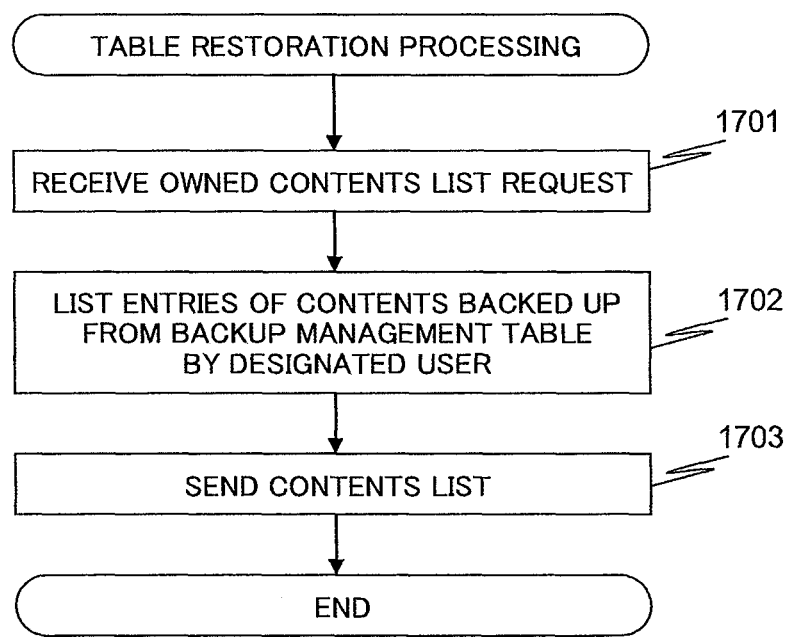
FIG. 17 is a flowchart explaining table restoration processing.

FIG. 17 shows the processing flow of the table restoration function 0112 in the online storage 0109. This function returns the combination of content basic information 0312 and metadata 0313 of the content owned by the designated user from the backup management table 0114 to the home storage 0101*a*.

At step 1701, the online storage 0109 receives an owned contents list request from the home storage 0101*a*. At step 1702, the online storage 0109 extracts all entries with the same user name from the backup management table 0114. At step 1703, the online storage 0109 returns the created contents list to the home storage 0101*a*.

Figures 18, 19:
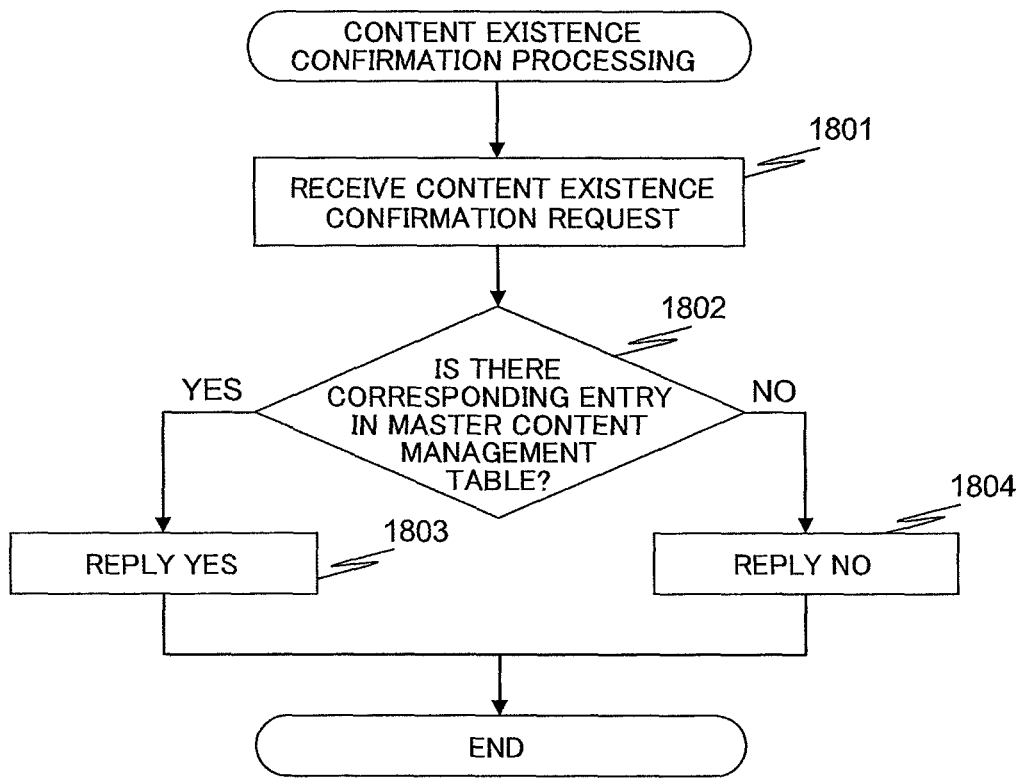
FIG. 18 is a flowchart explaining content existence confirmation processing.
FIG. 19 is a configuration diagram showing format priority.

FIG. 18 shows the processing flow of the content existence confirmation function in the content provider server 0116. This function is used for the purpose of checking whether the designated content is stored in the content provider server 0116.

At step 1801, the content provider server 0116 receives a content existence confirmation request from the online storage 0109. At step 1802, the content provider server 0116 checks whether the designated content exists in the content provider server 0116, and proceeds to step 1803 if it exists and proceeds to step 1804 if it does not exist. For the check in the step 1802, the master content management table 0119 of the content provider server 0116 is utilized. In the master content management table 0119, for each content stored in the content provider server 0116, information including a category of the content, a start time of distributing the content, an end time of distributing the content, a bit rate of the content, and a format of the content is registered. The content provider server 0116 compares the information registered in the master content management table 0119 and the information designated by the content existence confirmation request in the step 1802. If the source of the content designated by the content existence confirmation request indicates the content provider server 0116 itself, the same category designated by the content existence confirmation request is registered in the master content management table 0119, the recording start time and the recording end time designated by the content existence confirmation request are within a time frame from the start time of distributing the content to the end time of distributing the content registered in the master content management table 0119, and quality of the content determined by the format and the bit rate designated by the content existence confirmation request is lower or the same as quality of the content determined by the format and the bit rate registered in the master content management table 0119, the content provider server 0116 determined that the designated content exists in the content provider server 0116.

At step 1803, the content provider server 0116 replies YES. At step 1804, the content provider server 0116 replies NO.

FIG. 19 is a table showing the priority of format to be used by the online storage 0109 or the content provider server 0116 when checking the quality of the content. A content format is aligned for each priority. For example, this shows that the highest quality format is AVI (Audio Video Interleaving).

When the online storage 0109 or the content provider server 0116 is to compare the quality, it foremost compares the bit rate. Regardless of the format, the content with a lower bit rate is determined to be of lower quality. Subsequently, if the bit rates are the same, then the formats are compared. The differences in quality among formats are compared based on the table of FIG. 19.

Figure 20:
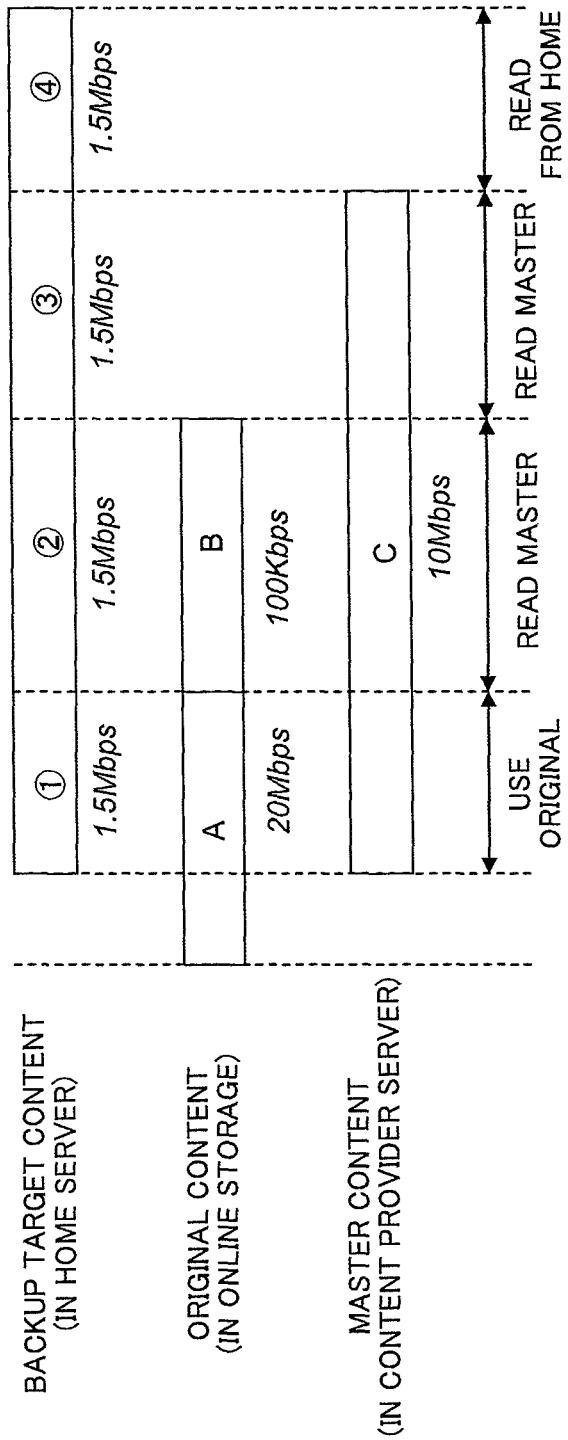
FIG. 20 is a supplementary diagram explaining content backup processing.

FIG. 20 explains an example of the differences in situation regarding the online storage 0109 upon processing the data backup request; specifically, which portion of the backup target content should use the original content as is, which portion should be read from the content provider server 0116, and which portion should be read from the home storage 0101a.

In this example, the backup target content in the home storage 0101a is converted at a bit rate of 1.5 Mbps. The backup target content can be divided into four parts of (1) to (4).

Part (1) of the backup target content shows a case where the original content A is already stored in the online storage 0109. The online storage 0109 refers to the original content management table 0113 and, since the original has a higher bit rate 0207 and the recording start time 0204 and the recording end time 0206 are also contained in the original content A, determines that there is no need to send the content regarding part (1).

Part (2) of the backup target content shows a case where the original content B exists in the same time frame, but the bit rate is 300 Kbps, which is lower than the 1.5 Mbps of the backup target content, and the original content B is of inferior quality and cannot be used. Meanwhile, the content provider server 0116 is storing part (2) of the backup target content as content C, and the content C has a higher bit rate. Thus, the online storage 0109 reads the portion corresponding to part (2) of the backup target content from the content provider server 0116.

Part (3) of the backup target content shows a case where there is no original content, but there is a master content C. Here, the online storage 0109 reads the portion corresponding to part (3) of the backup target content from content provider server 0116.

Part (4) of the backup target content shows a case of a time frame that does not include either the original content or the master content. In the foregoing case, the online storage 0109 reads part (4) of the backup target content from the home storage 0101a.

In other words, if the online storage 0109 determines that a content (identical content) corresponding to the backup target content exists in the online storage 0109, it manages such existing content as the backup target content. Meanwhile, if the online storage 0109 determines that a content (identical content) corresponding to the backup target content does not exist in the online storage 0109 and exists in the content provider server 0116, it manages such existing content as the backup target content. Moreover, if the online storage 0109 determines that a content (identical content) corresponding to the backup target content does not exist in either the online storage 0109 or the content provider server 0116, it reads the backup target content existing in the home storage 0101a from the home storage 0101a and records such backup target content in the storage 0115.

Figure 21:
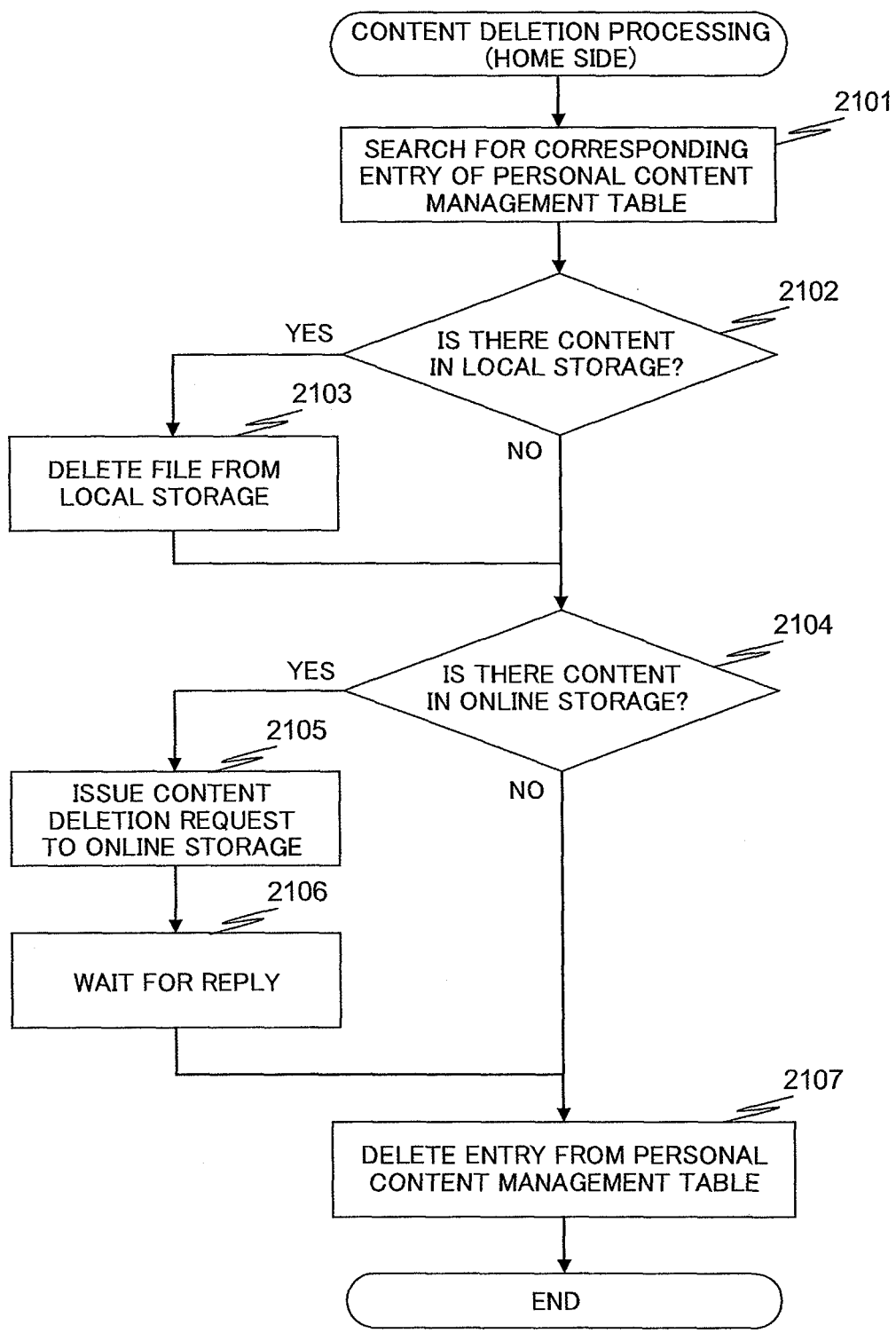
FIG. 21 is a flowchart explaining content deletion processing.

FIG. 21 shows the processing flow of the content deletion function 0121 for the home storage 0101a to delete the content designated by the user.

At step 2101, the home storage 0101a searches for an entry of the deletion target content from the personal content management table 0106. At step 2102, the home storage 0101a refers to the storage location column of the entry, and checks whether the deletion target content exists in the local storage 0107.

At step 2103, the home storage 0101a deletes the file corresponding to the content from the local storage 0107 if the deletion target content exists. At step 2104, the home storage 0101a refers to the storage location and the backup time, and checks whether the content exists in the online storage 0109.

At step 2105, the home storage 0101a issues a content deletion request to the online storage 0109. At step 2106, the home storage 0101a waits for a reply. At step 2107, the home storage 0101a deletes the corresponding entry from the personal content management table 0106.

Figure 22:
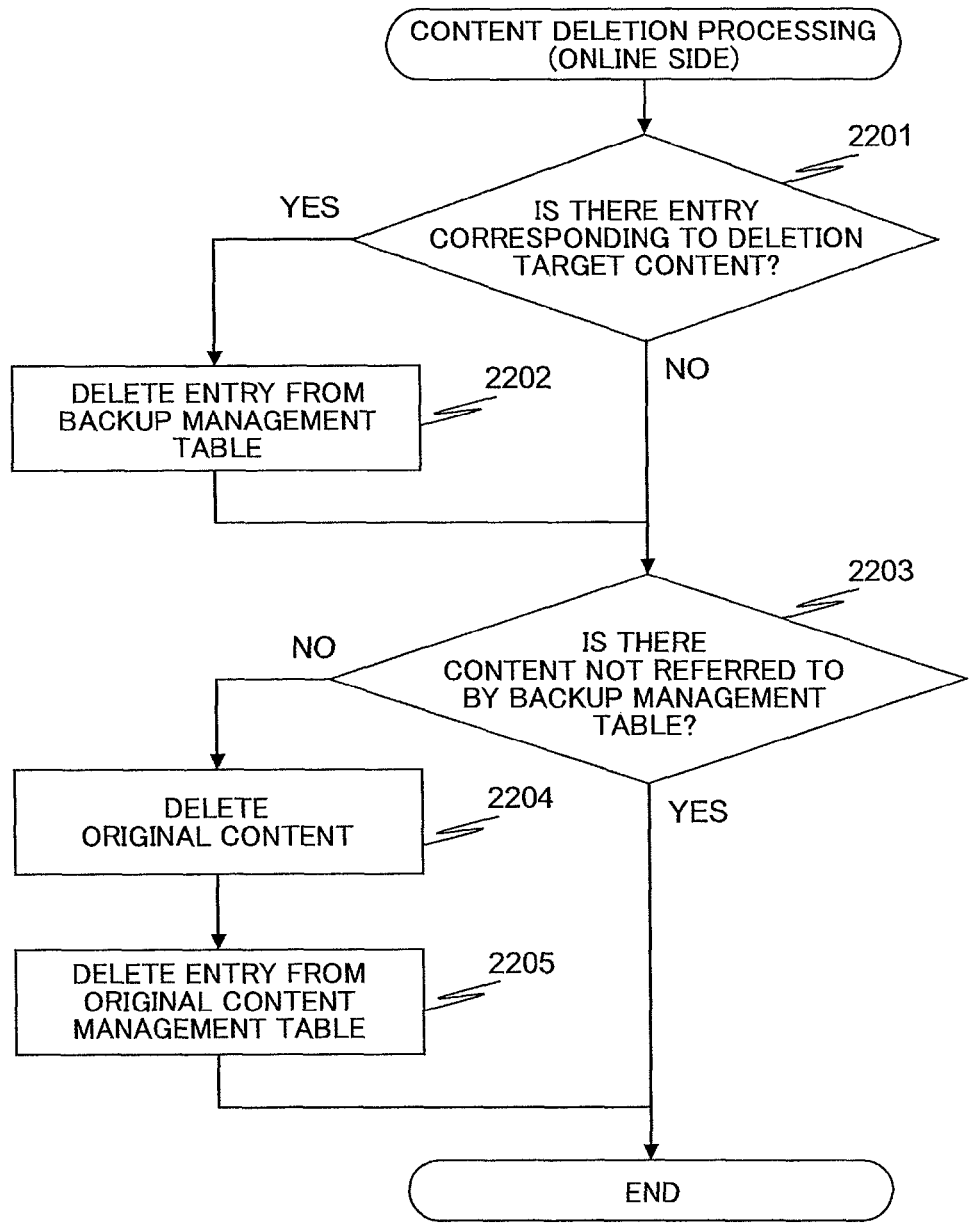
FIG. 22 is a flowchart explaining content deletion processing.

FIG. 22 shows the processing flow of the content deletion function 0122 for the online storage 0109 to delete the content according to a request from the home storage 0101a.

At step 2201, the online storage 0109 refers to the backup management table 0114 and checks whether there is a backup of the deletion target content. At step 2202, the online storage 0109 deletes the corresponding entry from the backup management table 0114 if such backup exists.

At step 2203, the online storage 0109 refers to the original content management table 0113, and checks whether there is any content that is not referred to by the backup management table 0114. At step 2204, the online storage 0109 specifies the file name from the storage location of the original content management table 0113, and deletes the relevant file from the storage. At step 2205, the online storage 0109 deletes the entry corresponding to the content deleted from the original content management table 0113.

A scheme may also be adopted where the bit rate is changed at the time of deleting the backup data so that the bit rate of the original content will coincide with the maximum value of the bit rate of the content in the backup management table 0114 that is referring to the original content.

As explained above, according to the present embodiment, all data in the home storages 0101a, 0101b can be backed up to the online storage 0109 without deteriorating the picture quality even if the line speed of the Internet 0108 connected to the home storages 0101a, 0101b is slow.

In addition, according to this embodiment, since the backup target content is transferred to the online storage 0109 using the upload line of the Internet 0108 only when a content (identical content) corresponding to the backup target content does not exist in the online storage 0109, all backup target contents can be backed up in the online storage 0109 without having to transfer all backup target contents to the online storage 0109 even if the bandwidth of the upload line of the Internet 0108 is narrow.

Second Embodiment

Figure 23:
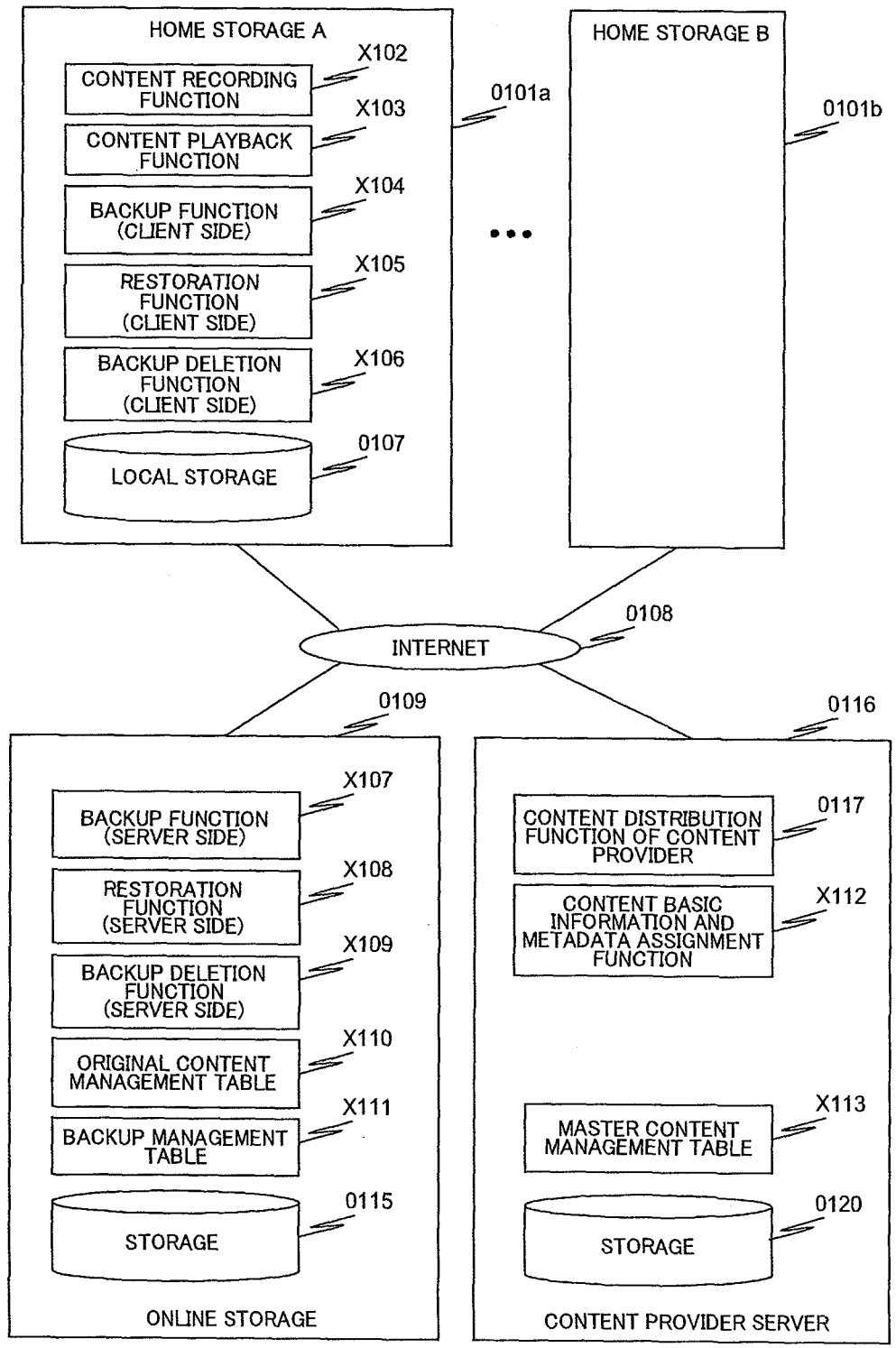
FIG. 23 is a configuration diagram of another embodiment of the content transfer system.

FIG. 23 shows a system configuration diagram of the second embodiment of the content transfer system.

This content transfer system is configured from one or more home storages 0101a, 0101b, an online storage 0109, and a content provider server 0116. These constituent features are connected via the Internet 0108, and are mutually communicable. The roles of the individual constituent features have been explained in the foregoing first embodiment, and the explanation thereof is omitted in the second embodiment.

The home storage comprises a content recording function X102, a content playback function X103, a backup function (client-side) X104, a restoration function (client-side) X105, a backup deletion function (client-side) X106, and a local storage 0107.

The online storage comprises a backup function (server-side) X107, a restoration function (server-side) X108, a backup deletion function (server-side) X109, an original content management table X110, a backup management table X111, and a storage 0115.

The content provider server comprises a content distribution function 0117 of the content provider, a content basic information and metadata assignment function X112, a master content management table X113, and a storage 0120.

In this embodiment, the content recording function, content playback function, backup function, restoration function, backup deletion function and so on to be used by the home storage are based on the premise of using functions and software available in standard hard disk recorders and PCs. Thus, the second embodiment is based on the premise that it is not possible to check whether it is necessary to send the contents based on the interaction between the home storage and the online storage explained in the foregoing first embodiment.

In other words, in the second embodiment, the home storage tentatively sends the backup target content to the online storage at the timing of backing up the content in the online storage, and determines whether to store the content in the online storage according to the redundancy of the content.

In the foregoing case, although it is not possible to overcome the problems of reducing network costs or completing the transfer of the content to the online storage in real time since the content will be sent from the home storage to the online storage even if such content is redundant on the one hand, there is an effect of being able to reduce the required capacity for storing the contents in the online storage on the other.

In the first embodiment explained above, the home storage realized the function of creating content basic information that is required for checking the redundancy of contents. In the second embodiment, however, this kind of function cannot be expected from the home storage. Thus, this problem is resolved by the content provider server interacting with the online storage.

Figure 24:
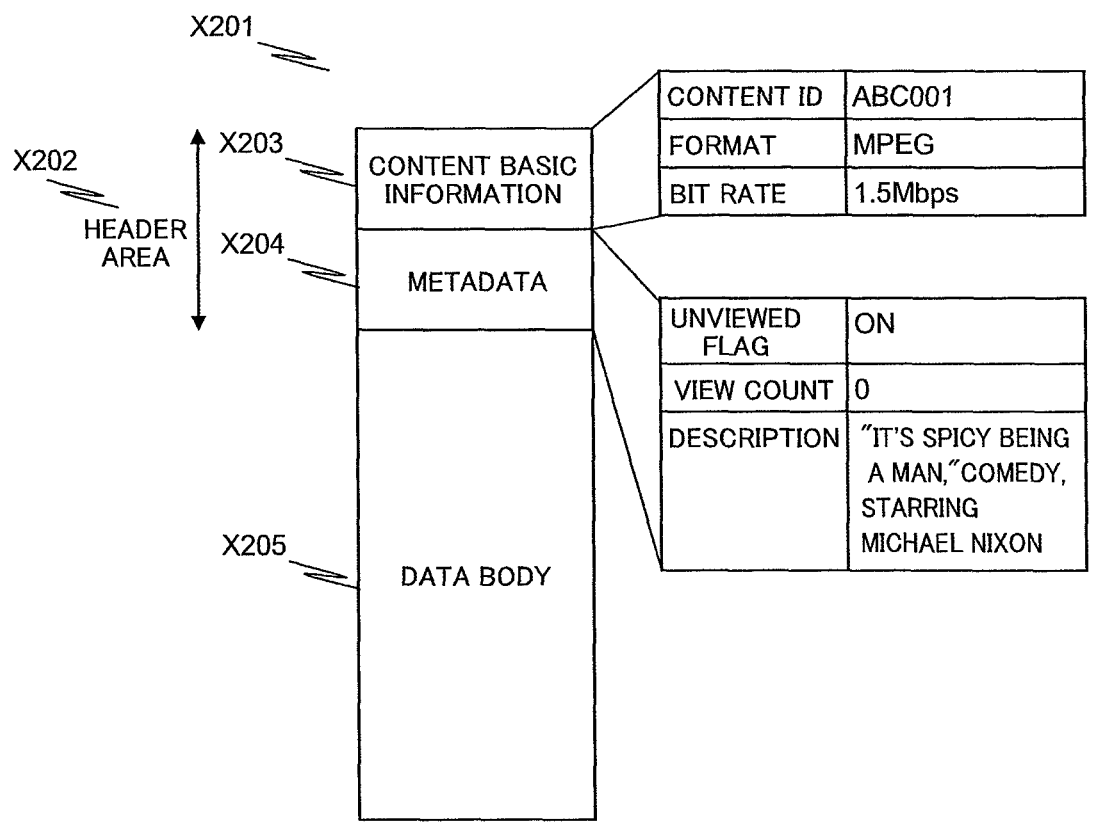
FIG. 24 is a configuration diagram of a file format of contents to be distributed by a content provider server to a home storage.

FIG. 24 shows a file format X201 of the content to be distributed by the content provider server to the home storage. The file format of the content can be broadly configured from a header X202 and the actual content X205. The header is configured from content basic information X203 and metadata X204. The content provider server enables the online storage to check the redundancy of contents by embedding information for checking the redundancy of contents into the content to be distributed. The content ID X206 in the content basic information is used for the redundancy check of contents. The content ID X206 is a globally unique ID, and is an ID that is assigned to the content by the content provider server upon creating or distributing the content. If the contents are of the same subject matter, then the content ID X206 will be the same.

The content basic information is configured from a content ID X206, a format X207, and a bit rate X208. The metadata is configured from an unviewed flag X209, a view count X210, and a description X211. Among the foregoing information, the content ID, format, bit rate, and description are information to be set by the content provider server before distributing the content. Among the foregoing information, at the very least, no one, including the home storage, is allowed to change the once-set subject matter of the content ID. In order to realize this, digital watermark technology of embedding non-removable watermark information in the video data can be used. By using this digital watermark technology, even if the bit rate or format of the content is changed, the content ID will remain the same. The unviewed flag and the view count are information that can be set by the home server. The home server may also set the unviewed flag and the view count based on the file format of the content.

Since the content ID of the content basic information cannot be changed throughout the entire process from the time of distribution to storage in the storage of the home storage, and even during the backup to the online storage, the content ID can be used to check the redundancy of contents.

FIG. 25 shows an example of the backup management table X111 managed by the online storage. The purpose of using the backup management table is the same as the first embodiment described above.

The backup management table is configured from an entry number X301, a user name X302, content basic information X303, and metadata X308. Each entry corresponds to the backup of one content. The content basic information is configured from a content ID X305, a format X306, and a bit rate X307, and is set by copying the value from the header information of the content upon backing up the content. The metadata is configured from an unviewed flag X309, a view count X310, and a description X311, and, as with the content basic information, this is also set by copying the value from the header information of the content upon backing up the content.

FIG. 26 shows an example of the original content management table X110 managed by the online storage. The purpose of using the original content management table is the same as the first embodiment described above.

The original content management table is configured from an entry number X401, a content ID X402, a format X403, a bit rate X404, and a storage location X405. The foregoing information is set by referring to the header information of the content to be stored upon newly storing a content or storing a content having a quality that is better than the quality of the stored content. The storage location is set according to the same method as the first embodiment described above.

FIG. 27 shows an example of the master content management table X113 managed by the content provider server. The purpose of using the master content management table is the same as the first embodiment described above.

The master content management table is configured from an entry number X501, a content ID X502, a format X503, a bit rate X504, a description X505, and a storage location X506. The content provider server sets the foregoing information based on the content information upon registering the content to be distributed. The content ID is set to be a globally unique ID.

Figure 28:
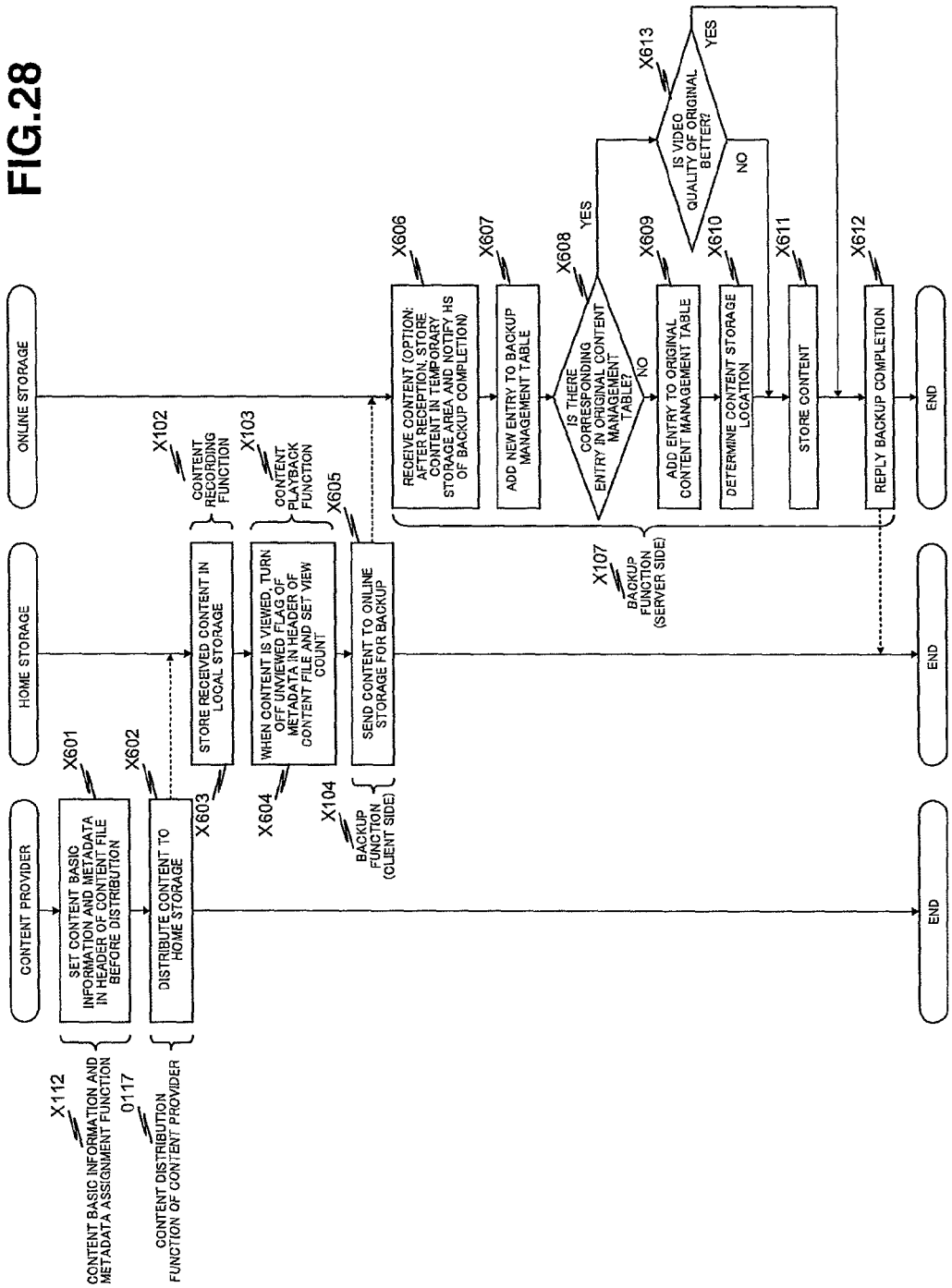
FIG. 28 is a flowchart from content distribution up to storage of such content in a home storage and backup of such content in the online storage.

FIG. 28 shows the processing flow from the distribution of the content, storage of such content in the home storage, and up to the backup of such content in the online storage. The content basic information and metadata assignment function, the content distribution function of the content provider, the content recording function, the content playback function, the backup function (client-side), and the backup function (server-side) of FIG. 23 are now explained with reference to this processing flow.

(Content Provider)

At step X601, before distributing the content, the content basic information and the metadata are set in the header of the content file. In doing so, the subject matter of the master content management table is also set according to the setting of the header.

At subsequent step X602, the content provider server distributes the content to the home storage. Here, the content file to which header information is attached is distributed to the home storage, and the processing by the content provider server is thereby complete.

(Home Storage)

As a result of the content being distributed to the home storage at step X601, the content received from the content service provider is stored in the local storage at step X603.

Subsequently, at step X604, if the user viewed the content, the value of the unviewed flag or view count in the file header of the content may also be changed. The format or bit rate of the content may also be changed.

At subsequent step X605, the content is sent to the online storage for backing up such content.

(Online Storage)

Based on the sending of the content at step 605, the online storage receives the content at step X606.

Subsequently, at step X607, the online storage adds a new entry to the backup management table, sets the content basic information and metadata of the backup management table based on the header information associated with the content, and then proceeds to step X608.

At step X608, the online storage refers to the content ID column of the original content management table, and determines whether the backed up content is already stored in the online storage.

If a negative determination is obtained at step X608; that is, if the backed up content has not been stored and is a new content, the online storage proceeds to step X609 to add a new entry to the original content management table, sets information based on the header information of the content, and then proceeds to step X610.

At step X610, the online storage determines the location of storing the content, proceeds to step X611 for storing the content in the content storage location, further proceeds to step X612 for notifying the home storage that the backup is complete, and thereby ends the online storage processing.

Meanwhile, if a positive determination is obtained at step X608 that is; if the original content already exists, the online storage proceeds to step X613 and ends the backup without performing any other process employing the same method as the first embodiment described above if the picture quality of the original content is better (proceeds to step X612). If the picture quality of the newly received content is better, the original content is updated with the newly received content, and the configuration information of the original content management table is also updated (same processing as the processing performed at step X611).

Figure 29:
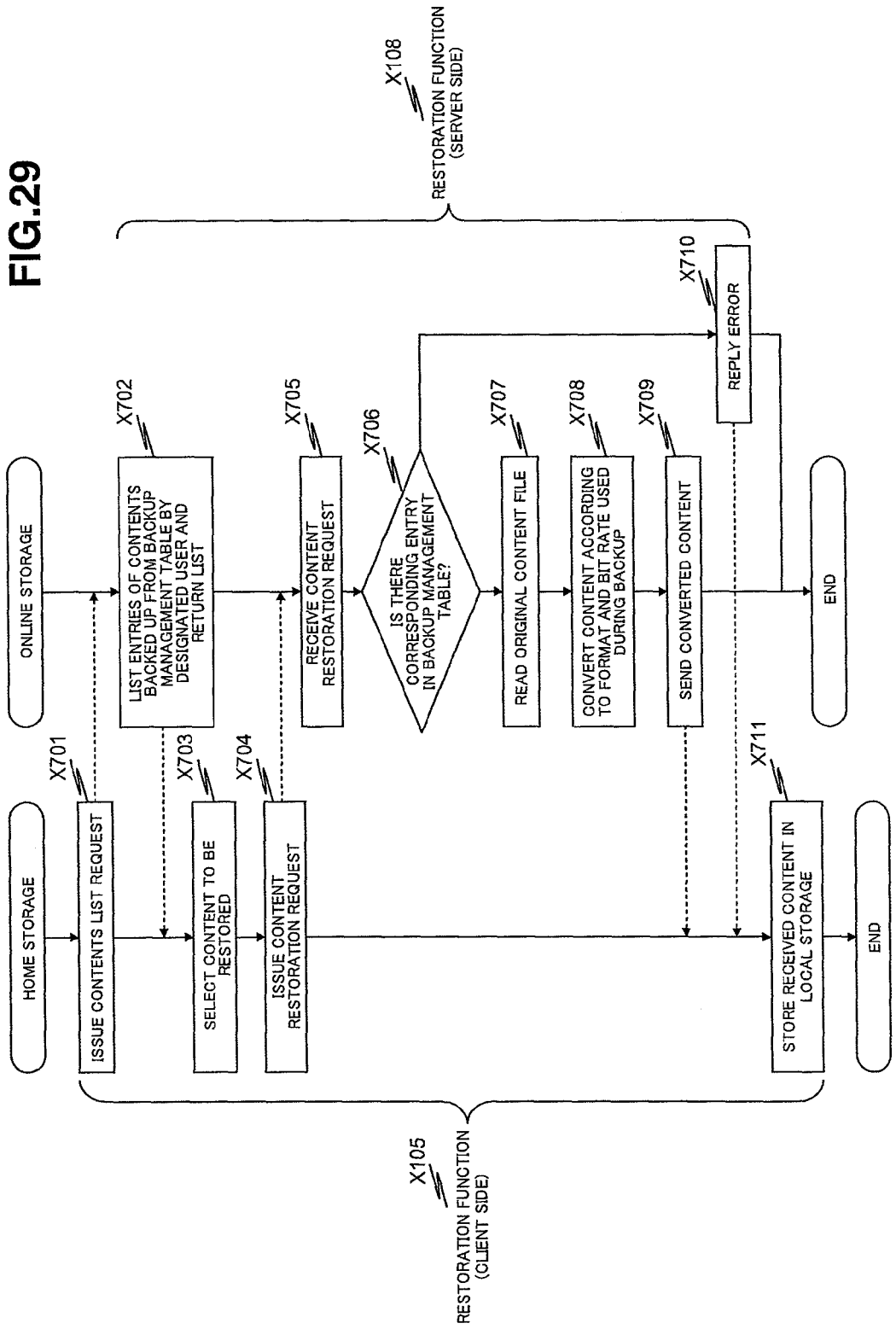
FIG. 29 is a flowchart for restoring the content.

The processing flow during the restoration of contents is now explained with reference to FIG. 29. FIG. 29 explains the communication protocol between the restoration function (client-side) and the restoration function (server-side).

At step X701 (home storage), the home storage requests the online storage to display a list of the contents that it backed up.

Based on this request, the online storage refers to the backup management table at step X702, and returns a list of the contents backed up by the requesting user to the home storage.

Based on the returned list of contents, on the home storage side at step X703, the user using the home storage refers to the displayed list of contents, determines the contents to be restored, subsequently proceeds to step X704, and requests (issues a request to) the online storage to restore the contents designated by the user.

Upon receiving this request, the online storage receives the content restoration request from the home storage at step X705.

Subsequently, at step X706, the online storage confirms whether the file requested to be restored by the user exists as a backup.

If a positive determination is obtained at step X706, the online storage proceeds to step X707 and reads the original content corresponding to the restored content, thereafter proceeds to step X708 and refers to the backup management table, converts the content to the bit rate and format of the content to be restored into the bit rate and format at the time of backup, and then proceeds to step X709.

At step X709, the converted content is sent to the home storage.

The home storage that received such content completes the restoration by storing such received content in the local storage at step X711.

Meanwhile, if a negative determination is obtained at step X706; that is, upon receiving a restoration request of a content in which the backup thereof does not exist, the online storage returns an error message to the home storage (step X710).

Figure 30:
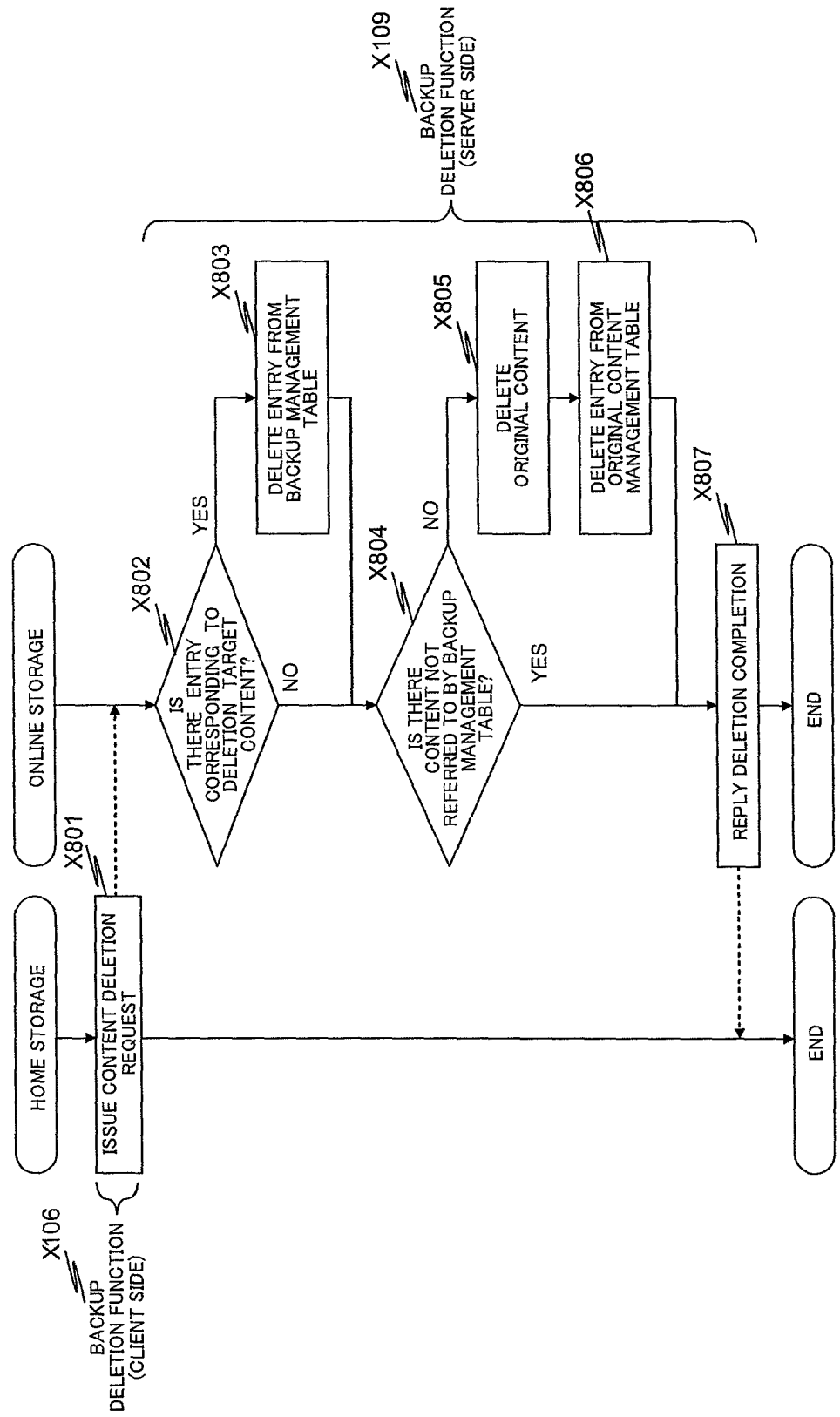
FIG. 30 is a flowchart for the home storage to delete the backup content in the online storage.

FIG. 30 shows the processing flow when the home storage is to delete the backup content in the online storage. The backup deletion function (client-side) and the backup deletion function (server-side) are now explained with reference to FIG. 30.

The home storage, at step X801, issues a request to the online storage for deleting the backup data of contents designated by the user based on the user's instructions and the like.

Upon receiving this request, the online storage refers to the backup management table at step X802, and determines whether the deletion target backup data designated by the user is deletable.

If a positive determination is obtained at step X802; that is, if the deletion target backup data is deletable, the online storage proceeds to step X803 and deletes the corresponding entry from the backup management table, and then proceeds to step X804. If a negative determination is obtained at step X802, the online storage proceeds to step X804.

At step X804, the online storage refers to the backup management table and the original content management table, and checks whether there is any original content that is not being referred to by the backup data.

If a negative determination is obtained at step X804; that is, if there is such an original content, the online storage proceeds to step X805 and deletes the original content, subsequently proceeds to step X806 and deletes the entry corresponding to the deleted content from the original content management table, and then proceeds to step X807. If a positive determination is obtained at step X804, the online storage proceeds to step X807.

At step X807, the online storage notifies the home storage that the deletion of backup data is complete, and thereby ends the online storage processing.

Incidentally, the first embodiment and the second embodiment are merely examples, and the embodiments of the present invention shall not in any way be limited by the foregoing embodiments.

For example, when the online storage is to confirm whether the backup target content that was requested to be backed up by the home storage of a certain household is already stored in the online storage, instead of executing the search processing for all contents stored in the online storage, it is also possible to execute search processing for only the contents that were backed up from the same type of home storage of a different household in the past. Examples of a "same type of home storage" would be, for instance, home storage manufactured by the same manufacturer, home storages having the same product name, home storages having the same model number, and so on.

In order to realize the above, the respective home storages should store apparatus type information including the manufacturer name, product name, model number, etc. in a ROM or the like, and send such apparatus type information to the online storage upon the respective home storages requesting such online storage to back up contents. As a result of using the original content management table to manage the apparatus type information received from the home storage, the online storage will be able to manage which contents were backed up from the home storage having which apparatus type information. If the online storage receives a backup request from the home storage, it may refer to the original content management table by using the apparatus type information received from the home storage together with the backup request, and limit the search target to the contents to be backed up from the home storage having the same apparatus type information. Thereby, since the search speed can be increased, the identity check of contents can also be sped up. The inclusion of the manufacturer name, product name and model number in the apparatus type information is merely an example, and only a part of such information may be included, or other types of information may be included.

As a different example, there is an embodiment that uses DLNA (Digital Living Network Alliance) as the communication protocol between the home storage and the online storage. During backup, the online storage becomes the DLNA server, the home storage becomes the DLNA client, and the online storage is able to back up data by reading contents in a file format (or codec) prescribed in the DLNA protocol. In the foregoing case, since files are recorded in standard format, a program for confirming the consistency of the subject matter of the contents can be easily loaded into the online storage. During backup, the content basic information may also be acquired in accordance with the timing of acquiring the file using an interface for acquiring metadata as prescribed in the DLNA. Incidentally, it is also possible to install a proxy server between the online storage and the home storage to use the DLNA protocol between the home storage and the protocol converter, provide the backup function or restoration function explained in the first embodiment and the second embodiment in the protocol converter, and cause the protocol converter to read contents from the home storage according to the DLNA protocol and back up the read contents in the online storage using the means explained in the first embodiment and the second embodiment.

As another embodiment, backup operation can be executed from not only the home storage but also a cell phone to the online storage. The backup operation from the cell phone is similar to the backup operation from the home storage, but when contents of the cell phone are copied to the online storage, a cellular network is utilized for communications between the cell phone and the online storage instead of the internet.

What is claimed is:

1. A content transfer system comprising:
a plurality of first storages storing first contents;
a second storage storing second contents; and
a third storage storing third contents;
wherein said first storages, said second storage and said third storage are connected via a communication network, and send and receive information concerning each of said contents via the communication network;
wherein said first storages send identifying information for specifying a backup target among said first contents to said second storage;
wherein said second storage receives said identifying information, determines whether said backup target content exists in said second contents or said third contents based on said identifying information and sends a determination result to said first storages;
wherein if said backup target content exists in said second contents and said third contents, said second storage compares a first quality of a part of said backup target content existing in said first contents, a second quality of a part of said backup target content existing in said second contents and a third quality of a part of said backup target content existing in said third contents;
wherein if said backup target content exists only in said second contents, said second storage compares said first quality with said second quality;
wherein if said backup target content exists only in said third contents, said second storage compares said first quality and said third quality;
wherein said first storages send said target content and management information to be used for managing the backup of said backup target content to said second storage if said first storages receive said determination result indicating that said backup target content does not exist in said second contents or said third contents;
wherein said first storages send the part of said backup target content and management information to be used for managing the backup of said backup target content to said second storage if said first storages receive said determination result indicating that said second quality and said third quality are inferior to said first quality;
wherein said first storages send said management information to be used for managing the backup of said backup target content to said second storage if said first storages receive said determination result indicating that said backup target content exists in said second contents or said third contents, and if said first quality is inferior to said second quality or said third quality;
wherein said second storage requests said third storage to transfer the part of said backup target content existing in said third contents if said backup target content exists in said third contents and if said third quality is better than said first quality and said second quality; and
wherein said management information to be used for managing the backup of said backup target content is configured from metadata that is associated with said backup target content.

2. The content transfer system according to claim 1, wherein said first storages transfer said backup target content to said second storage on condition of receiving a determination result from said second storage indicating that a content corresponding to said backup target content does not exist in said second contents.

3. The content transfer system according to claim 1, wherein identifying information of said backup target content includes a source showing the recording source that recorded said backup target content, a recording start time, and a recording end time; and wherein said second storage determines whether a content that coincides with the subject matter of said backup target content exists in said second contents based on said source, said recording start time, and said recording end time.

4. The content transfer system according to claim 1, wherein identifying information of said backup target content includes a source showing the recording source that recorded said backup target content, a recording start time, a recording end time, a format, and a bit rate; and
wherein said second storage determines that a content corresponding to said backup target content exists in said second contents if a content having the identical source, recording start time, and recording end time exists in said second contents even if said format and said bit rate are different, and determines that a content corresponding to said backup target content does not exist in said second contents in all other cases.

5. The content transfer system according to claim 1, wherein said second storage manages and stores the picture quality each time said backup target content is transferred from said first storages; and wherein said second storage converts the picture quality of said stored content into the picture quality at the time of transfer from said first storages when said first storages request the transfer of the stored content and the picture quality of said stored content is different from the picture quality at the time of transfer from said first storages, and transfers said content with the converted picture quality to said first storages.

6. A content transfer method of a content transfer system comprising a plurality of first storages for recording first contents, a second storage for recording second contents and managing said first contents, and a third storage for recording third contents,
wherein said first storages, said second storage and said third storage are connected via a communication network, and send and receive information concerning each of said contents via the communication network,
wherein said first storages execute:
a step of sending identifying information for specifying a backup target content to said second storage and requesting said second storage to determine the existence of a content corresponding to said backup target content upon requesting said second storage to back up said backup target content among said first contents; and
a step of transferring management information to be used for managing the backup of said backup target content to said second storage in substitute for transferring said backup target content upon receiving a reply from said second storage indicating that a content corresponding to said backup target content exists in said second contents;
wherein said second storage executes:
a step of determining the existence of a content corresponding to said backup target content based on identifying information, and a step of transferring the determination result to said first storages in response to the request from said first storages;
a step of requesting said third storage to transfer a content corresponding to said backup target content upon determining that a content corresponding to said backup target content does not exist in said second contents based on identifying information of said backup target content in response to the request from said first storages; and
a step of transferring a determination result indicating the existence of a content corresponding to said backup target content to said first storages on condition of receiving the transfer of a content corresponding to said backup target content from said third storage;
wherein if said backup target content exists in said second contents and said third contents, said second storage compares a first quality of a part of said backup target content, a second quality of a part of said backup target content existing in said second contents and a third quality of a part of said backup target content existing in said third contents;
wherein if said backup target content exists only in said second contents, said second storage compares said first quality with said second quality;
wherein if said backup target content exists only in said third contents, said second storage compares said first quality and said third quality;
wherein said first storages send said target content and management information to be used for managing the backup of said backup target content to said second storage if said first storages receive said determination result indicating that said backup target content does not exist in said second contents or said third contents;
wherein said first storages send the part of said backup target content and management information to be used for managing the backup of said backup target content to said second storage if said first storages receive said determination result indicating that said second quality and said third quality are inferior to said first quality;
wherein said first storages send said management information to be used for managing the backup of said backup target content to said second storage if said first storages receive said determination result indicating that said backup target content exists in said second contents or said third contents, and if said first quality is inferior to said second quality or said third quality; and
wherein said management information to be used for managing the backup of said backup target content is configured from metadata that is associated with said backup target content.

7. The content transfer method according to claim 6, wherein said first storages execute:
a step of transferring said backup target content to said second storage on condition of receiving a determination result from said second storage indicating that a content corresponding to said backup target content does not exist in said second contents.

8. The content transfer method according to claim 6, wherein identifying information of said backup target content includes a source showing the recording source that recorded said backup target content, a recording start time, and a recording end time; and
wherein said second storage executes:
a step of determining whether a content that coincides with the subject matter of said backup target content exists in said second contents based on said source, said recording start time, and said recording end time.

9. The content transfer method according to claim 6, wherein identifying information of said backup target content includes a source showing the recording source that recorded said backup target content, a recording start time, a recording end time, a format, and a bit rate; and
wherein said second storage executes:
a step of determining that a content corresponding to said backup target content exists in said second contents if a content having the identical source, recording start time, and recording end time exists in said second contents even if said format and said bit rate are different; and
a step of determining that a content corresponding to said backup target content does not exist in said second contents in all other cases.

10. The content transfer method according to claim 6, wherein said second storage executes:
a step of managing and storing the picture quality each time said backup target content is transferred from said first storages;
a step of converting the picture quality of said stored content into the picture quality at the time of transfer from said first storages when said first storages requests the transfer of the stored content and the picture quality of said stored content is different from the picture quality at the time of transfer from said first storages; and
a step of transferring said content with the converted picture quality to said first storages.

11. The content transfer system according to claim 1, wherein said second storage returns the content basic information and metadata to the first storages according to a request from the first storages.

12. The content transfer system according to claim 1, wherein said articles of metadata comprises an unviewed flag showing whether a user played video content, a view count showing how many times the user played the same content, explanatory information concerning subject matter of the contents and information concerning contents that can be received with an EPG (Electronic Program Guide).

13. The content transfer method according to claim 6, wherein said second storage returns the content basic information and metadata to the first storages according to a request from the first storages.

14. The content transfer method according to claim 6, wherein said wherein said articles of metadata comprises an unviewed flag showing whether a user played video content, a view count showing how many times the user played the same content, explanatory information concerning subject matter of the contents and information concerning contents that can be received with an EPG (Electronic Program Guide).

* * * * *